(12) United States Patent
Kumada et al.

(10) Patent No.: US 7,609,414 B2
(45) Date of Patent: Oct. 27, 2009

(54) IMAGE PROCESSING METHOD, IMAGE PROCESSOR, STORAGE MEDIUM AND PROGRAM

(75) Inventors: Shuichi Kumada, Kanagawa (JP); Yoko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 599 days.

(21) Appl. No.: 10/995,403

(22) Filed: Nov. 23, 2004

(65) Prior Publication Data

US 2005/0141057 A1 Jun. 30, 2005

(30) Foreign Application Priority Data

Nov. 28, 2003 (JP) .............................. 2003-400742

(51) Int. Cl.
G06F 15/00 (2006.01)
G03F 3/08 (2006.01)
G06F 3/12 (2006.01)

(52) U.S. Cl. ..................... 358/1.9; 358/504; 358/518; 358/1.15

(58) Field of Classification Search .................. 358/1.9, 358/1.15, 402, 3.16, 1.13, 406, 518, 504; 399/1; 356/406–407, 419
See application file for complete search history.

(56) References Cited

U.S. PATENT DOCUMENTS

| 5,960,110 A | 9/1999 | Usami | |
|---|---|---|---|
| 6,344,902 B1 * | 2/2002 | Duke et al. | 358/1.9 |
| 6,538,773 B1 * | 3/2003 | Brossman et al. | 358/3.16 |
| 7,079,270 B2 | 7/2006 | Kiyosu | |
| 7,345,788 B2 | 3/2008 | Kiyosu | |
| 2002/0181017 A1 * | 12/2002 | Such et al. | 358/1.15 |
| 2003/0007154 A1 * | 1/2003 | Tandon et al. | 356/406 |
| 2004/0207862 A1 * | 10/2004 | Such et al. | 358/1.9 |

FOREIGN PATENT DOCUMENTS

| JP | 07-288704 | 10/1995 |
|---|---|---|
| JP | 2001-324846 | 11/2001 |
| JP | 2002-290762 | 10/2002 |
| JP | 2003-025691 | 1/2003 |
| JP | 2003-025693 | 1/2003 |

\* cited by examiner

Primary Examiner—Edward L Coles
Assistant Examiner—Charlotte M Baker
(74) Attorney, Agent, or Firm—Canon USA Inc IP Div

(57) ABSTRACT

In order to obtain consistent output by a remote color printer over a communication network, a calibration is remotely performed on the remote color printer. More specifically, job data, including setting information for a calibration, is received, and the setting for the calibration is switched in accordance with the setting information between performing calibration processing on the job data by using calibration data obtained based on the setting information and performing calibration processing on the job data and job data received after the job data by using calibration data obtained based on the setting information.

10 Claims, 31 Drawing Sheets

FIG. 8

| C | M | Y | K |
|---|---|---|---|
| 20 | 20 | 0 | 0 |
| 0 | 20 | 20 | 0 |
| 20 | 0 | 20 | 0 |
| 20 | 20 | 20 | 0 |
| ⋮ | ⋮ | ⋮ | ⋮ |

IMAGE PROCESSING METHOD, IMAGE PROCESSOR, STORAGE MEDIUM AND PROGRAM

BACKGROUND OF THE INVENTION

1. Field of the Invention

The present invention relates to an image processing method, image processor, storage medium and program.

2. Description of the Related Art

In recent years, color printers have been developed that output a proof or galley proof directly from electronic data in the digitized steps of creating printed matter.

Furthermore, in a typical scenario, delivery costs are incurred in the outputting proofs step creating printing matter. For example, upon receiving a customer's order, a designer outputs a proof from electronic data by using a color printer, and then must deliver the proof to the customer. Accordingly, under the above scenario, designers have a need for sending data to remote color printer, e.g., a customer's printer, for directly outputting a proof on the remote color printer.

In order to cause a remote color printer to consistently output the same output results, calibration is required for the printing system that includes the remote color printer and an associated print server. A method of performing calibration on a printing system includes (1) remotely causing the printing system to patch-output, (2) providing the patch output (result) to a scanner or densitometer, which is a different apparatus from the color printer, by an operator of a remote printing system, (3) reading the patch output by using the scanner or densitometer, and (4) providing data resulting from the reading back to the printing system. In other words, user intervention is required in order to calibrate the printing system.

Several documents disclose technologies relating to the above-described conventional technology. Japanese Patent Laid-Open No. 2001-324846 discloses a conventional density sensor including, in a holder, a light emitter such as an LED and a photoreceptor such as a photodiode and a CdS, wherein a density of a patch is measured by irradiating light from the light emitter to the patch on a transfer belt and receiving light reflected by the patch by the photoreceptor. Japanese Patent Laid-Open No. 10-136219 (corresponding to U.S. Pat. No. 5,960,110) discloses a method of correcting a printer profile from a few colorimetry values of patch data.

Furthermore, Japanese Patent Laid-Open No. 07-288704 discloses a printing system having a color printer and a print server, wherein the print server controls the color printer to perform a calibration.

FIG. 31 is a diagram showing a conventional communication network system including a printing system having a color printer and a print server. The communication network system in FIG. 31 includes a remote communication network system where Site a and Site b are connected over a large communication network such as a wide area network (WAN). Site a includes Client a, e.g., a PC and a monitor. Site b, on the other hand, includes a frontend server 3101 acting as a printer controller, a printer engine 3102 of the color printer, which connects the printer to the communication network via the frontend server 3101, and Client b, e.g., including a PC and a monitor. Both Client a and Client b include a central processing unit (CPU) and video random access memory (VRAM) required for monitor display and image processing, and a communication function required for communication over a communication network.

When, in the communication network system, a calibration is automatically performed by remotely controlling the printer engine 3102 in remote Site b from Client a in Site a, the following problems are raised: (1) Client b outputs and prints job data to the printer engine 3102 having the setting of calibration data; (2) In accordance with an instruction from Client a, a calibration is automatically performed in the printer engine 3102; (3) The same job as the printing job at (1) is sent from Client b to the printer engine 3102. While Client b expects that substantially the same print results can be obtained since the a same job is performed by a same printer at (1) and (3), the printed matter resulting from (1) and (3) have different colors since a calibration is performed at (2).

When printing and calibration are performed over a WAN, it is difficult to notify a client located at one site on the WAN of the fact that a calibration has been performed on a printer located at a different site on the WAN. Notification is especially difficult when a calibration is automatically performed on the printer, i.e., calibration is performed without user intervention, as no client in a particular site may recognize that a calibration has been performed.

SUMMARY OF THE INVENTION

The present invention seeks to address the foregoing problems. Accordingly, it is an aspect of the present invention to provide a printing system and method for performing a calibration on a remote printer in order to provide consistent outputs to the printer over a communication network.

More specifically, according to the present invention, job data including setting information for a calibration is received, and the setting for the calibration is switched, in accordance with the setting information, between performing calibration processing only on the job data using calibration data obtained based on the setting information and performing calibration processing on the job data and job data received after the job data using calibration data obtained based on the setting information.

Further aspects, features and advantages of the present invention will become apparent from the following description of the preferred embodiments with reference to the attached drawings.

BRIEF DESCRIPTION OF THE DRAWINGS

FIG. 7A is a diagram showing patch data (standard) having different tones of single colors, and FIG. 7B is a diagram showing patch data having different tones of mixed colors.

FIG. 8 is a diagram showing an example of multi-order color patch data of CMYK mixed colors according to Embodiments 1-1 and 2-1 of the invention.

FIG. 23A is a diagram showing remote calibration settings among calibration settings in job ticket data, and FIG. 23B is a diagram showing UIs of calibration settings.

FIG. 30A is a diagram showing remote calibration settings among calibration settings in job ticket data, and FIG. 30B is a diagram showing UIs of calibration settings.

DESCRIPTION OF THE EMBODIMENTS

Figure 1:
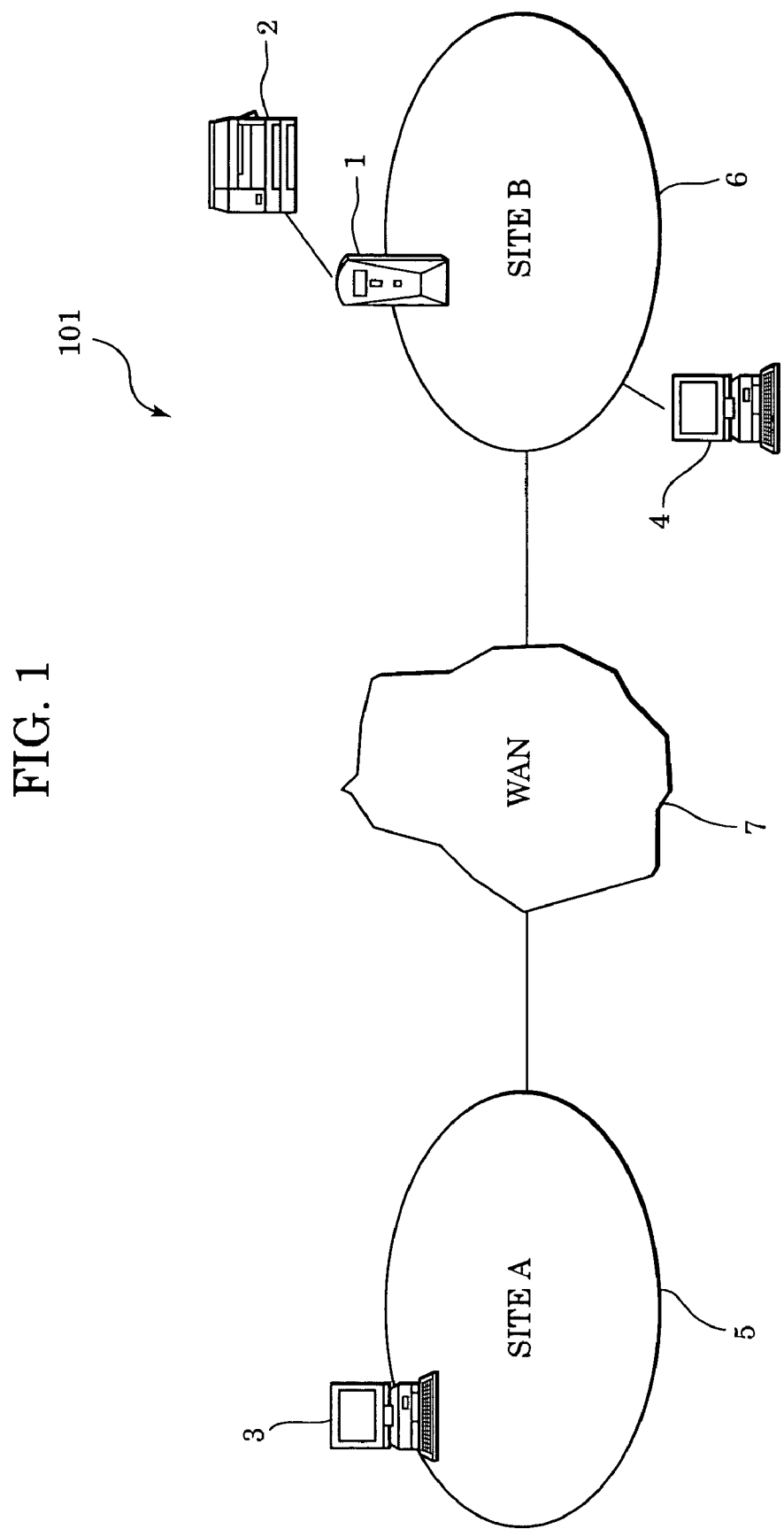
FIG. 1 is a diagram showing a construction of a communication network system according to Embodiments 1-1, 2-1 and 3-1 of the invention.

Embodiments of the invention will be described below in detail with reference to drawings. The same reference numerals are given to parts having same functions in the drawings, and the repetitive descriptions are omitted herein.

Embodiment 1-1

FIG. 1 is a diagram showing a communication network system according to Embodiment 1-1 of the present invention. As shown in FIG. 1, a communication network system 101 includes sites A 5 and B 6 connected by a large communication network such as a WAN 7. Site A 5 includes Client A 3. Site B 6 includes a frontend server 1, which acts as a printer controller, a printer engine 2 for a color printer, where the printer engine 2 is connected to the communication network via the frontend server 1, and Client B 4. Both Client A 3 and Client B 4 include a CPU and VRAM required for monitor display and image processing, and a communication function required for communication over the communication network. A printing system including a frontend server and a printer may also be connected to Site B 6. In addition, other clients may be connected to Sites A 5 and B 6.

In the following description of FIG. 1, Site A 5 represents a designer's location and Site B 6 represents a customer's location. Data is sent from Client A 3 to the printer engine 2 of a customer's printer in a digitized process in which a designer creates printed matter in response to an order from the customer so that a proof can be directly output from the customer's color printer. In this case, in order to consistently output the same results from the remote printer engine 2, a calibration is performed on the printing system including the printer engine 2 and the frontend server 1.

In one method therefor, first, the frontend server 1 adds information on the implementation of a calibration to job data from Client A 3 and receives job data in accordance with the information on the implementation of the calibration. Then, the frontend server 1 instructs the printer engine 2 to patchoutput. The printer engine 2 patch-outputs, and a color sensor in the printer engine 2 reads the patch output and provides the read data back to the frontend server 1. Thus, the frontend server 1 performs a calibration on the printing system.

Figure 2:
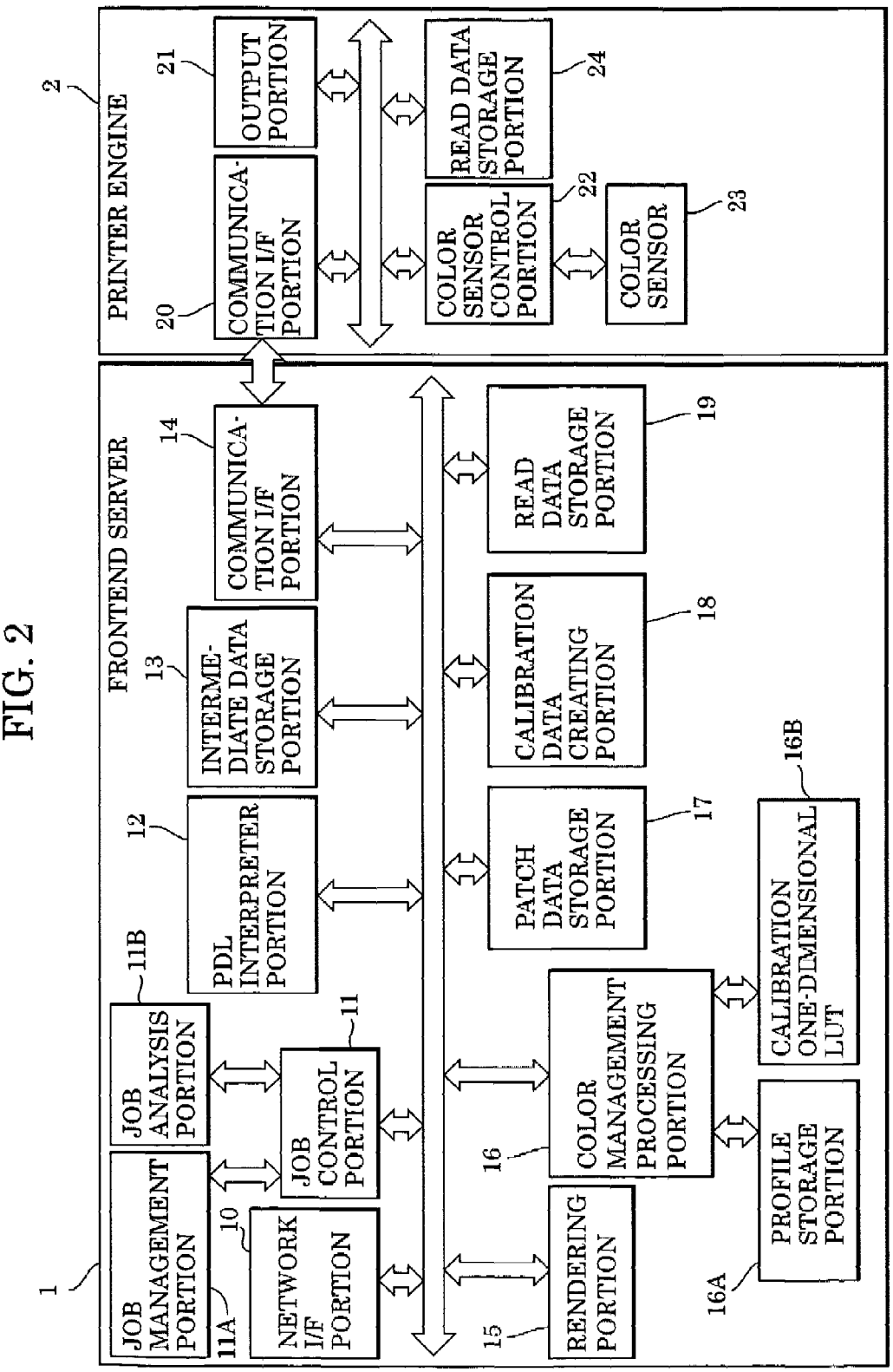
FIG. 2 is a diagram showing a configuration of a printing system according to Embodiments 1-1 and 2-1 of the invention.

FIG. 2 shows a configuration of the frontend server 1 and printer engine 2 of the printing system of the present embodiment. As shown in FIG. 2, the frontend server 1 includes a network interface (I/F) portion 10, a job control portion 11, a PDL interpreter portion 12, an intermediate data storage portion 13, a communication interface portion 14, and a rendering portion 15. The network I/F portion 10 is used for connecting to a communication network. The job control portion 11 controls job data, and includes a job management portion 11A and a job analysis portion 11B. The job management portion 11A performs management functions such as holding jobs. The job analysis portion 11B analyzes job ticket data in a job. The PDL interpreter portion 12 analyzes a page description language (PDL) and creates intermediate data. The intermediate data storage portion 13 stores intermediate data created by the PDL interpreter portion 12. The communication interface portion 14 is used for exchanging data with the printer engine 2. The rendering portion 15 converts intermediate data stored in the intermediate data storage portion 13 to bitmap image data.

The frontend server 1 also includes a color management processing portion 16, a patch data storage portion 17, a calibration data creating portion 18, and a read data storage portion 19. The color management processing portion 16 performs color management processing, e.g., selected color matching and calibration processing, on a job. The patch data storage portion 17 stores a patch to be used for creating calibration data. The calibration data creating portion 18 creates the calibration data. The read data storage portion 19 stores data read by the color sensor 23 of the printer engine 2.

The color management processing portion 16 has a profile storage portion 16A and a calibration one-dimensional Look-Up Table (LUT) storage portion 16B. The profile storage portion 16A stores a profile to be used for color matching. The calibration one-dimensional LUT storage portion 16B stores a one-dimensional LUT for adjusting density for forming yellow, magenta, cyan and black images among calibration data.

The printer engine 2 includes a communication I/F portion 20, an output portion 21, a color sensor control portion 22, an RGB-outputting color sensor 23, and a read data storage portion 24. The communication I/F portion 20 is used for exchanging data with the frontend server 1. The color sensor control portion 22 controls a color sensor. The color sensor 23 reads a patch output at color levels. The read data storage portion 24 stores data read by the color sensor 23.

Figure 3:
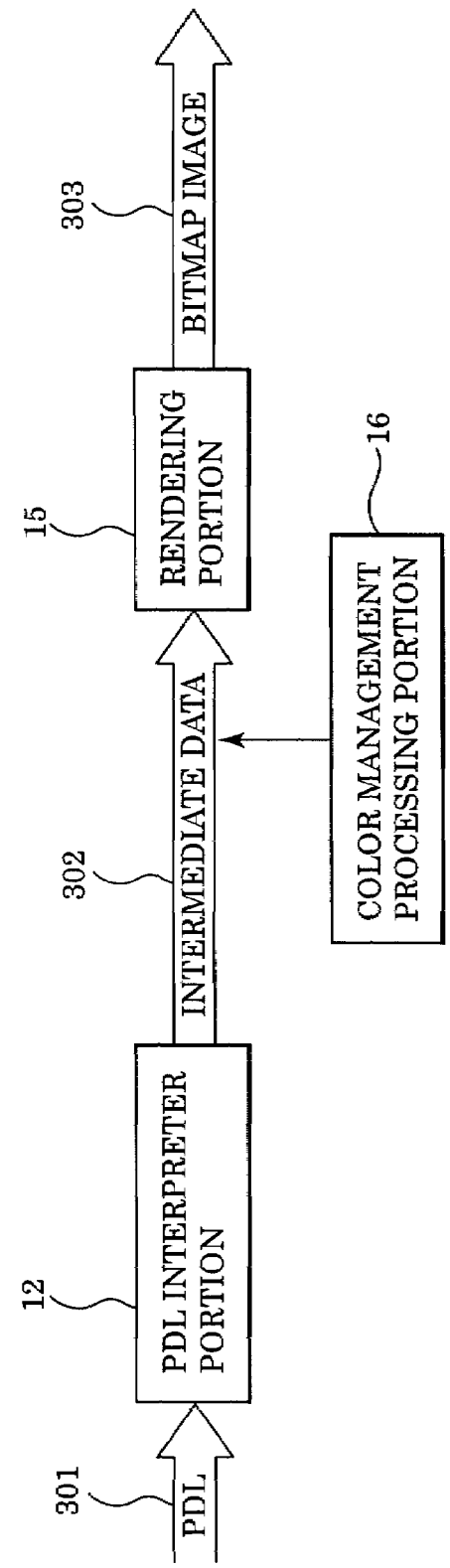
FIG. 3 is a diagram showing timing of color management processing according to Embodiments 1-1 and 2-1 of the invention.

FIG. 3 is a diagram showing timing of color management processing according to the present embodiment, in which PDL data in job data undergoes color management processing so as to be converted to bitmap image data. The PDL interpreter portion 12 analyzes PDL data 301 and creates intermediate data 302, which is intermediate code information before the expansion to a bitmap. The created intermediate data 302 is stored in the intermediate data storage portion 13, and the color management processing portion 16 performs color management processing on the intermediate data 302 stored in the intermediate data storage portion 13. The intermediate data 302 having undergone the color management processing is converted to bitmap image data 303 by the rendering portion 15. In this way, according to the present embodiment, the PDL interpreter portion 12 does not perform color management processing when intermediate data is held and performs color management processing after the holding of intermediate data is canceled.

Figure 4:
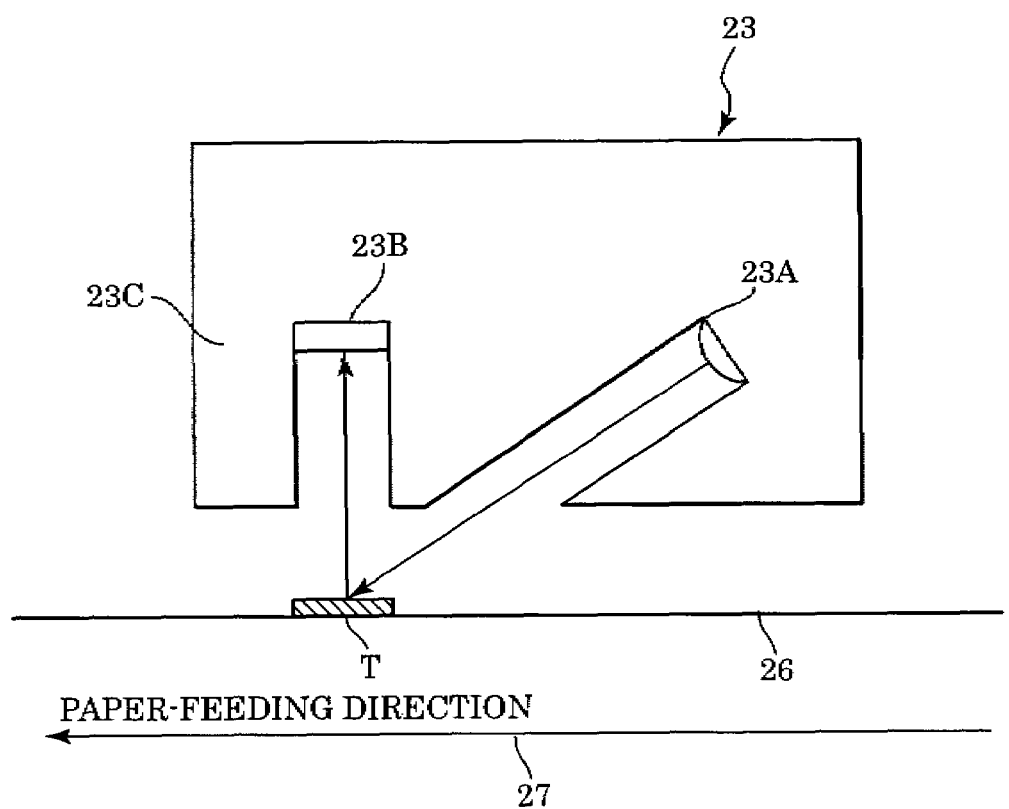
FIG. 4 is a diagram showing a color sensor according to Embodiments 1-1 and 2-1 of the invention.

FIG. 4 shows an example of an RGB-outputting color sensor applicable to the present embodiment. The color sensor 23 includes, in a holder 23C, a light emitter 23A such as an LED and a photoreceptor 23B such as a photodiode and a CdS. The color sensor 23 irradiates light from the light emitter 23A to a patch T printed on paper on a transfer belt 26 and receives light reflected by the patch T by using the photoreceptor 23B. Thus, the color sensor 23 can measure a color level of the patch T. The color sensor 23 is provided in the paper-feeder portion of a color printer and reads an image printed on paper fed in a paper-feeding direction 27 by using the array-like photoreceptor 23B orthogonal to the paper-feeding direction 27 shown in FIG. 4.

Figure 5:
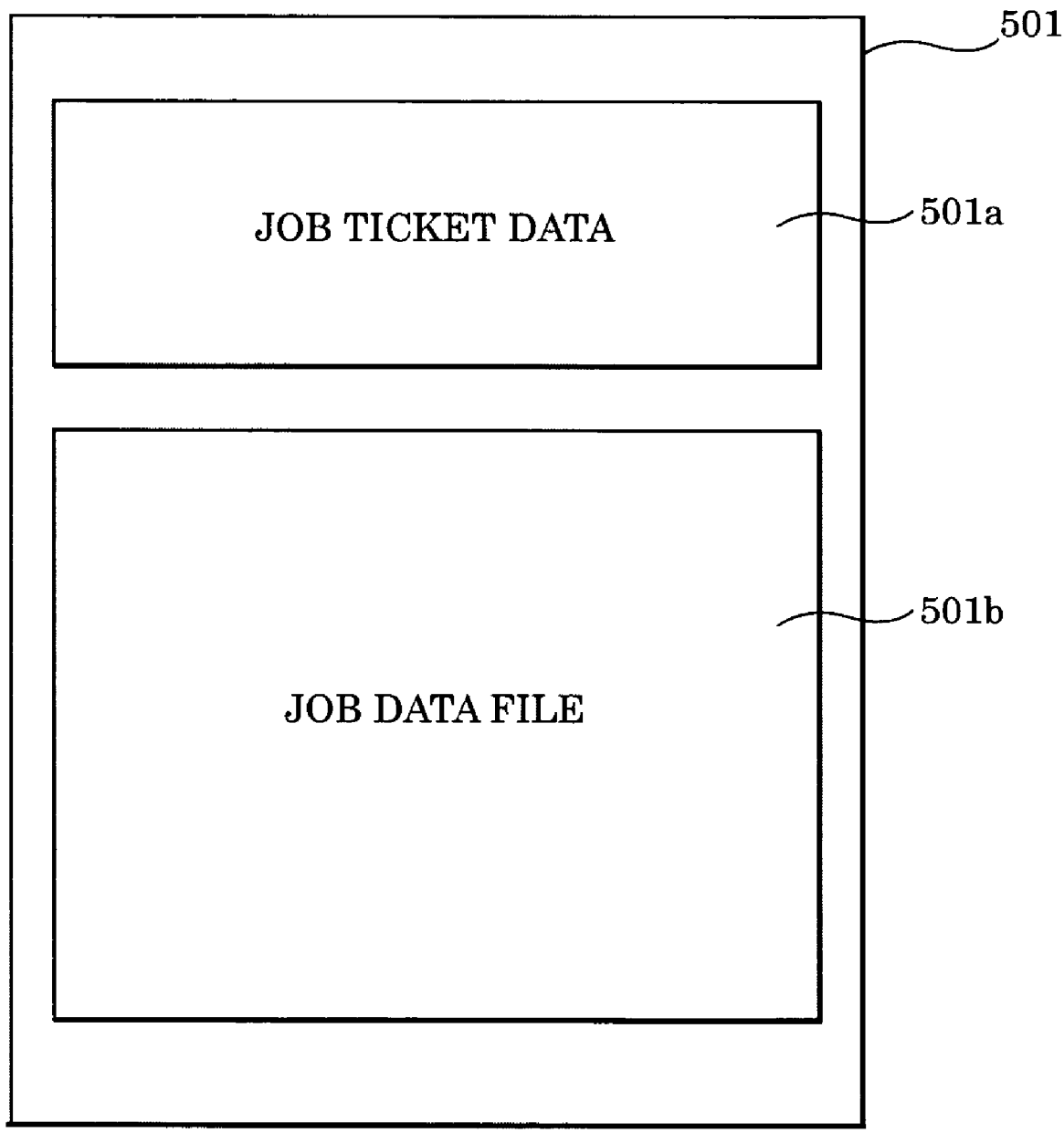
FIG. 5 is a configuration diagram of job data according to Embodiments 1-1 and 2-1 of the invention.

FIG. 5 is a configuration diagram of job data received by the frontend server 1. Job data 501 includes job ticket data 501a and a job data file 501b. The job ticket data 501a describes details of an instruction to perform processing on a job. The job data file 501b is actual image data in PDF (Portable Document Format), PS (PostScript), TIFF (Tagged Image File Format), or JPEG (Joint Photographic Experts Group).

Figure 6:
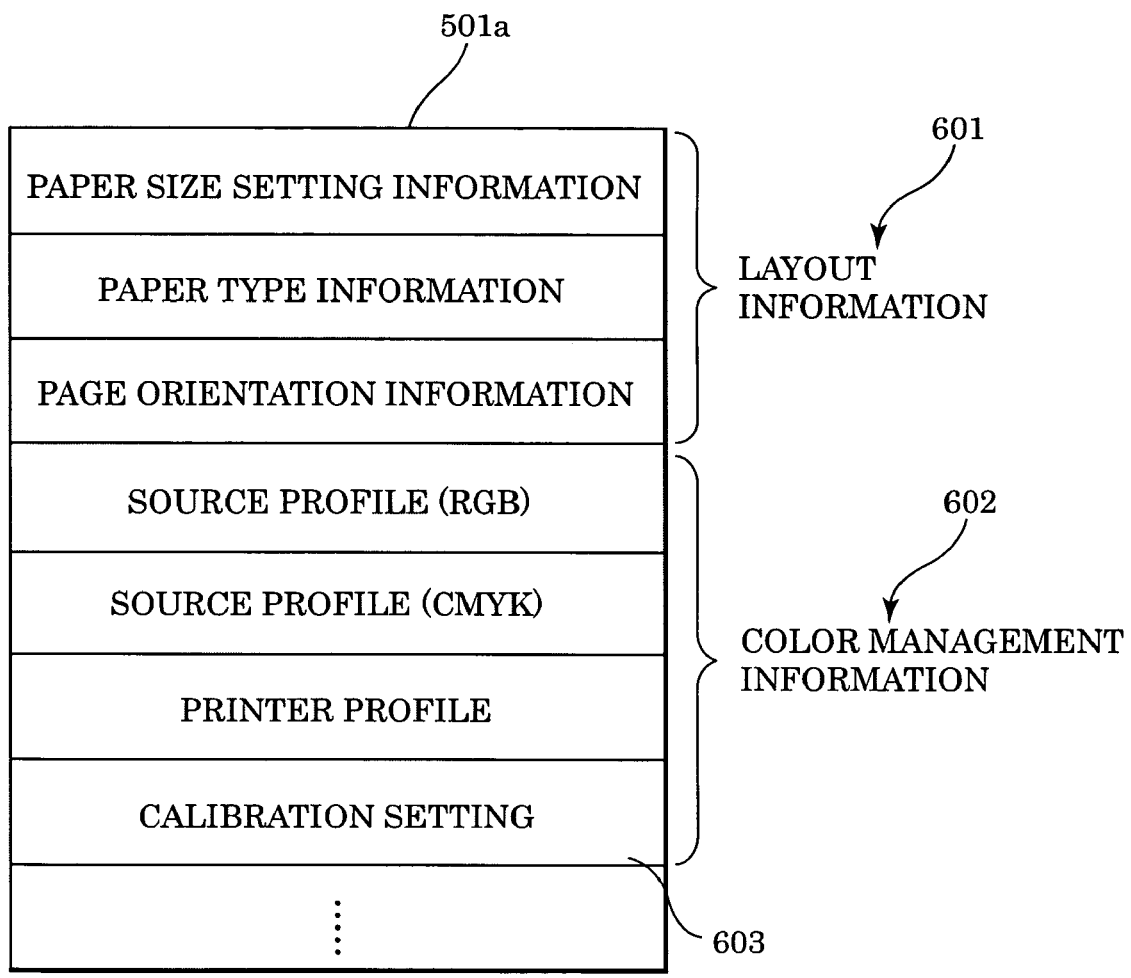
FIG. 6 is a diagram showing an internal configuration of job ticket data according to Embodiments 1-1 and 2-1 of the invention.

FIG. 6 shows an example of job ticket data. The job ticket data 501a includes layout information 601, which includes paper size setting information, paper type information and page orientation information. Color management information 602 includes RGB and CMYK source profile information, printer profile information and calibration setting information 603 for specifying data in the profile storage portion 16A. The calibration setting information 603 according to the present embodiment contains a flag (remote ON or remote OFF) indicating whether a calibration is remotely performed or not.

Figure 7A:
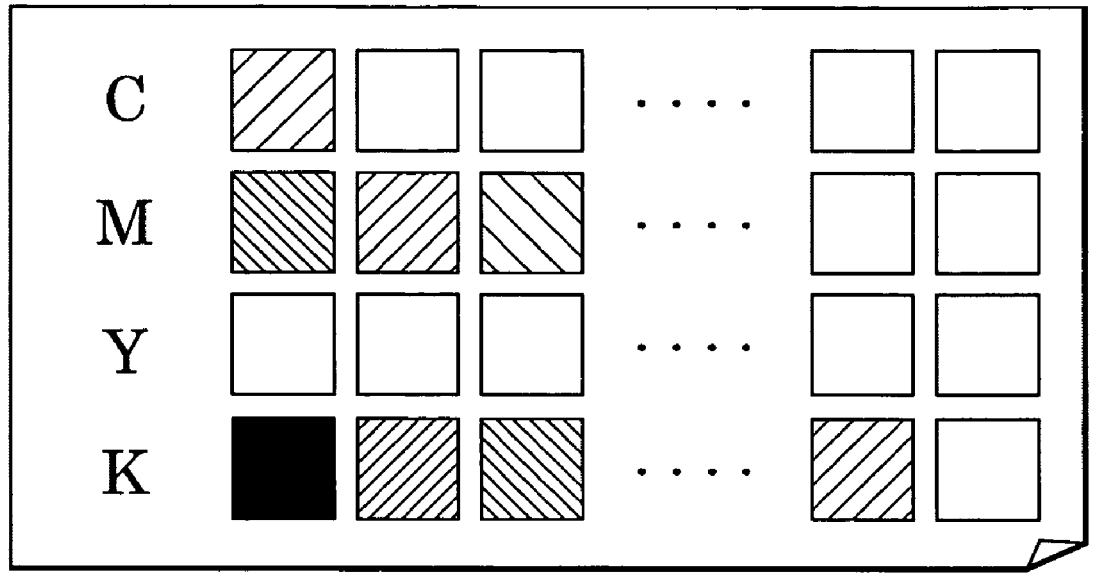
FIGS. 7A and 7B show an example of patch data according to Embodiments 1-1 and 2-1 of the invention.
Figure 7B:
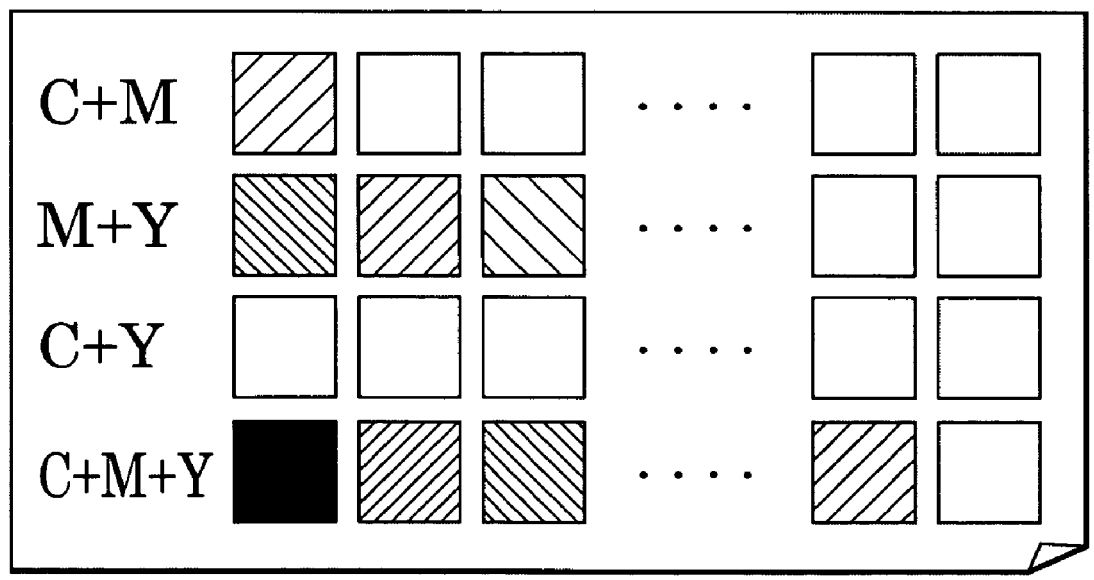

FIGS. 7A and 7B show examples of patch data to be used for creating calibration data. FIG. 7A is patch data (standard; CMYK primary colors) having different tones of single colors of C, M, Y and K. FIG. 7B is patch data (high precision; CMYK multi-order colors) having different tones of mixed colors of C, M, Y and K. Both sets of patch data are used for implementing a calibration method, which will be described later. The patch data in FIGS. 7A and 7B are stored in the patch data storage portion 17.

Figure 8:
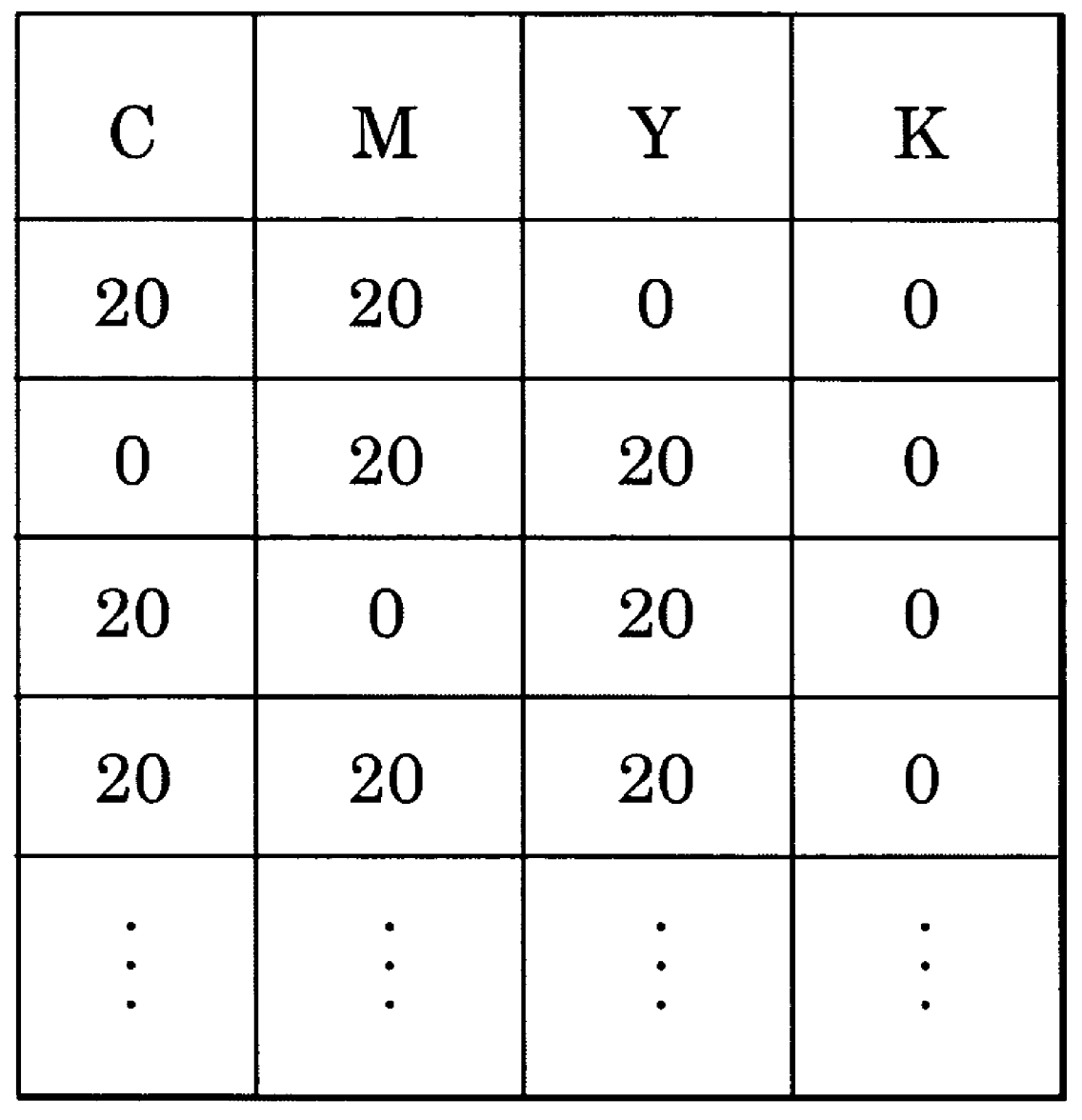

FIG. 8 shows an example of multi-order color patch data to be used for creating calibration data. Rows in the matrix shown in FIG. 8 are patch data having different combinations of C, M, Y and K values and numerically express the mixed colors depicted in FIG. 7B. The patch data in FIG. 8 is used for implementing the calibration method, which will be described later. The patch data in FIG. 8 is stored in the patch data storage portion 17.

Figure 9:
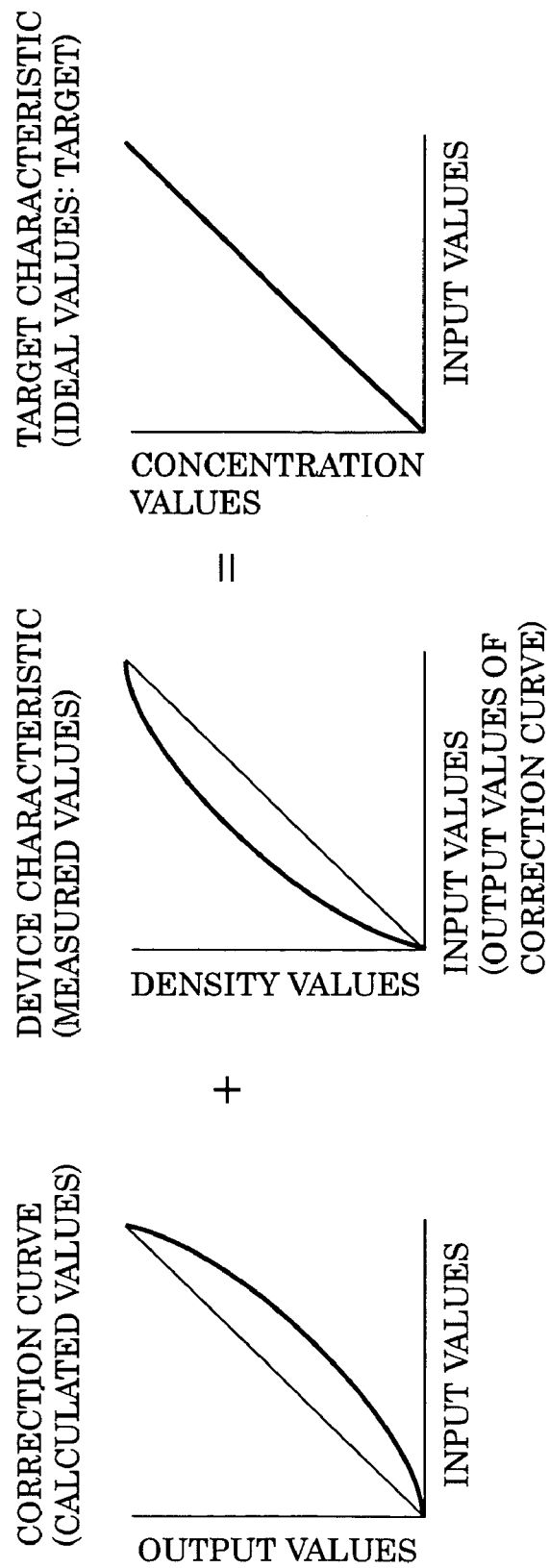
FIG. 9 is a conceptual diagram of processing for creating a one-dimensional LUT of CMYK according to Embodiments 1-1 and 2-1 of the invention.

FIG. 9 is a conceptual diagram of processing for creating a one-dimensional LUT of CMYK and shows a relationship among a correction curve, device characteristic, and target characteristic for correcting a one-dimensional LUT by calibration. Calibration data is data of a one-dimensional LUT expressing the correction curve. The correction curve is used for adjusting CMYK data to be processed to a target characteristic in consideration of a device characteristic calculated from reflected light from patch data.

Figure 10:
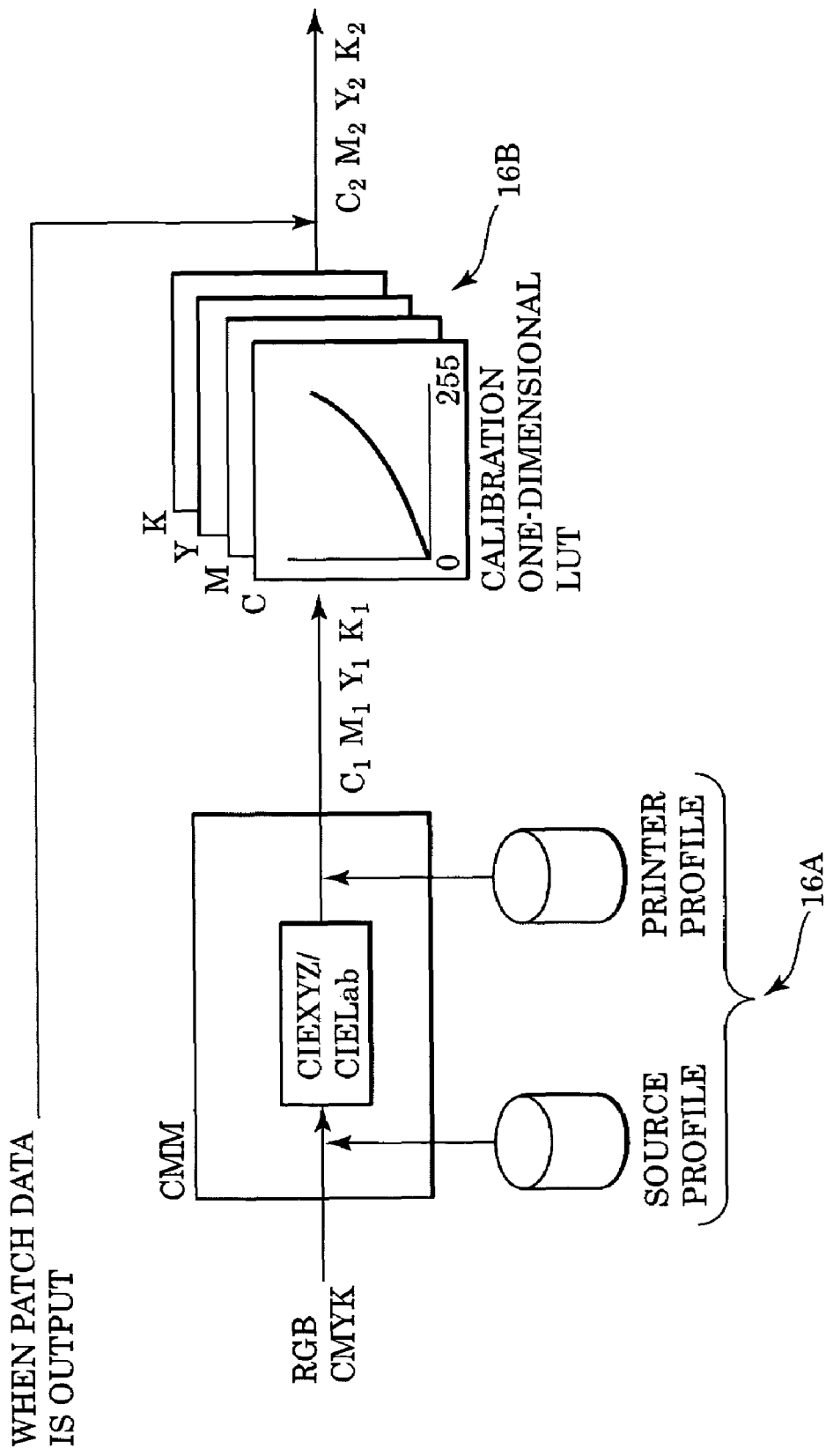
FIG. 10 is a flowchart of color management processing according to Embodiments 1-1 and 2-1 of the invention.

FIG. 10 is a diagram showing a processing flow of color management processing of image data in the color management processing portion 16. When RGB data or CMYK data is input, the color management processing portion 16 performs color matching through a source profile and printer profile stored in the profile storage portion 16A by using a Color Management Module (CMM) function. Next, the color management processing portion 16 passes data having undergone color-matching through the calibration one-dimensional LUT stored in the calibration one-dimensional LUT storage portion 16B and outputs the corrected CMYK data. In order to realize a change in device characteristic when patch data is output, the color management processing portion 16 outputs data without color matching processing.

Figure 11:
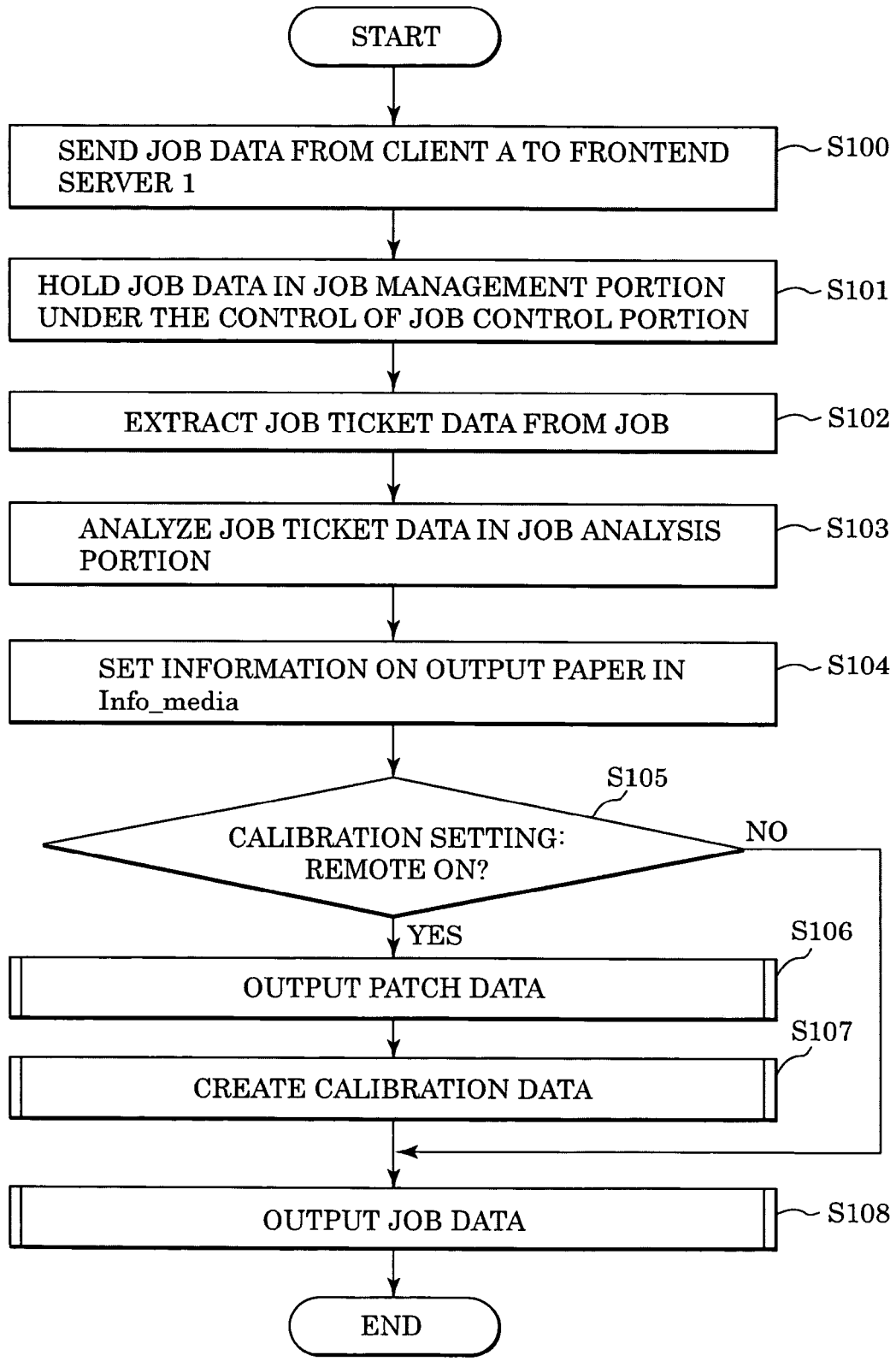
FIG. 11 is a flowchart of main processing of a calibration according to Embodiments 1-1, 2-1 and 3-1 of the invention.

FIG. 11 is a flowchart illustrating the main processing of a calibration in the printing system of the present embodiment. The processing steps in FIG. 11 represent processing to be performed by processors (not shown) located in the frontend server 1 and printer engine 2, and connections between the processors, where the processors read and execute programs loaded in system memories to perform the processing steps.

At step S100 in FIG. 11, job data from Client A 3 is sent to the front-end server 1 through the communication networks (WAN 7 and a local area network (LAN) on Client A's side. Then, the processing moves to step S101. In step S101, under the control of the job control portion 11, the job data is held in the job management portion 11A once, and data processing of job data files are sent into standby mode, after which the process moves to step S102. At step S102, job ticket data 501a is only extracted from the job data. Next, in step S103, the job ticket data 501a is analyzed by the job analysis portion 11B. In step S104, information on a paper type to be output in the job ticket data 501*a* is set in data (data name of "Info_media") in the system memory (not shown), and the processing moves to step S105.

At step S105, calibration setting information 603 is extracted from the job ticket data 501*a*, and it is checked to determine whether a calibration is remotely performed (remote ON). If it is determined that a calibration is not remotely performed, the processing moves to step S108 where existing calibration data not having undergone a calibration is used to remotely output the held job data onto a medium in accordance with the "Info_media" information. Then, the processing ends. If it is determined that a calibration is performed remotely, the processing moves to step S106 where patch data is output, and at the same time, is read by a color sensor 23 or a colorimeter (not shown). Next, in step S107, calibration data is created based on the value read from the patch data. As discussed above with respect to FIG. 10, when patch data is output, the calibration one-dimensional LUT outputs a same data value as that of the patch data having been input to the CMM. The processing then proceeds to step S108, where the calibration data created in step S107 is used to output the held job data, and then the processing ends.

Figure 12:
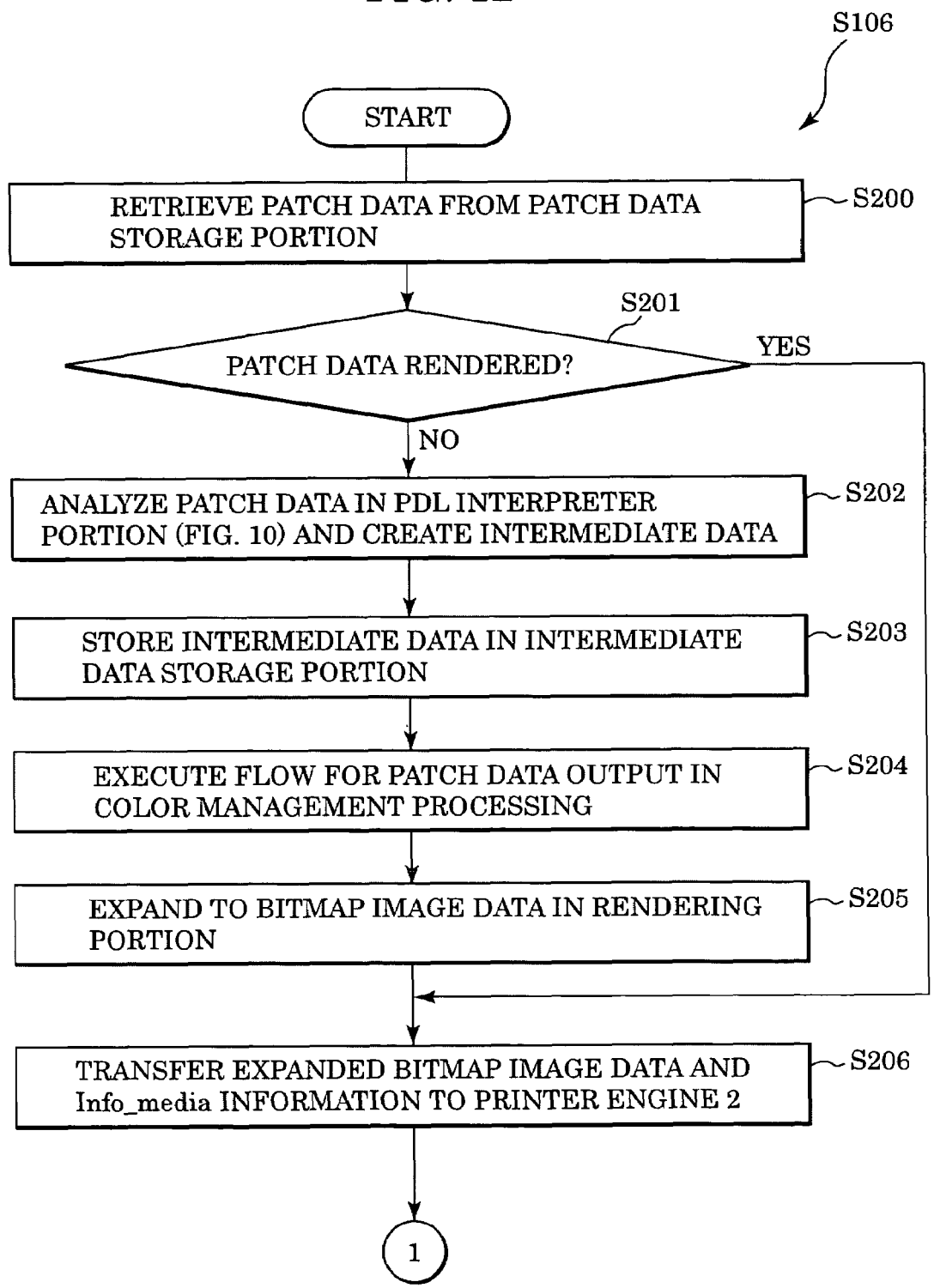
FIG. 12 is a flowchart of detail processing for outputting patch data according to Embodiments 1-1 and 2-1 of the invention.
Figure 13:
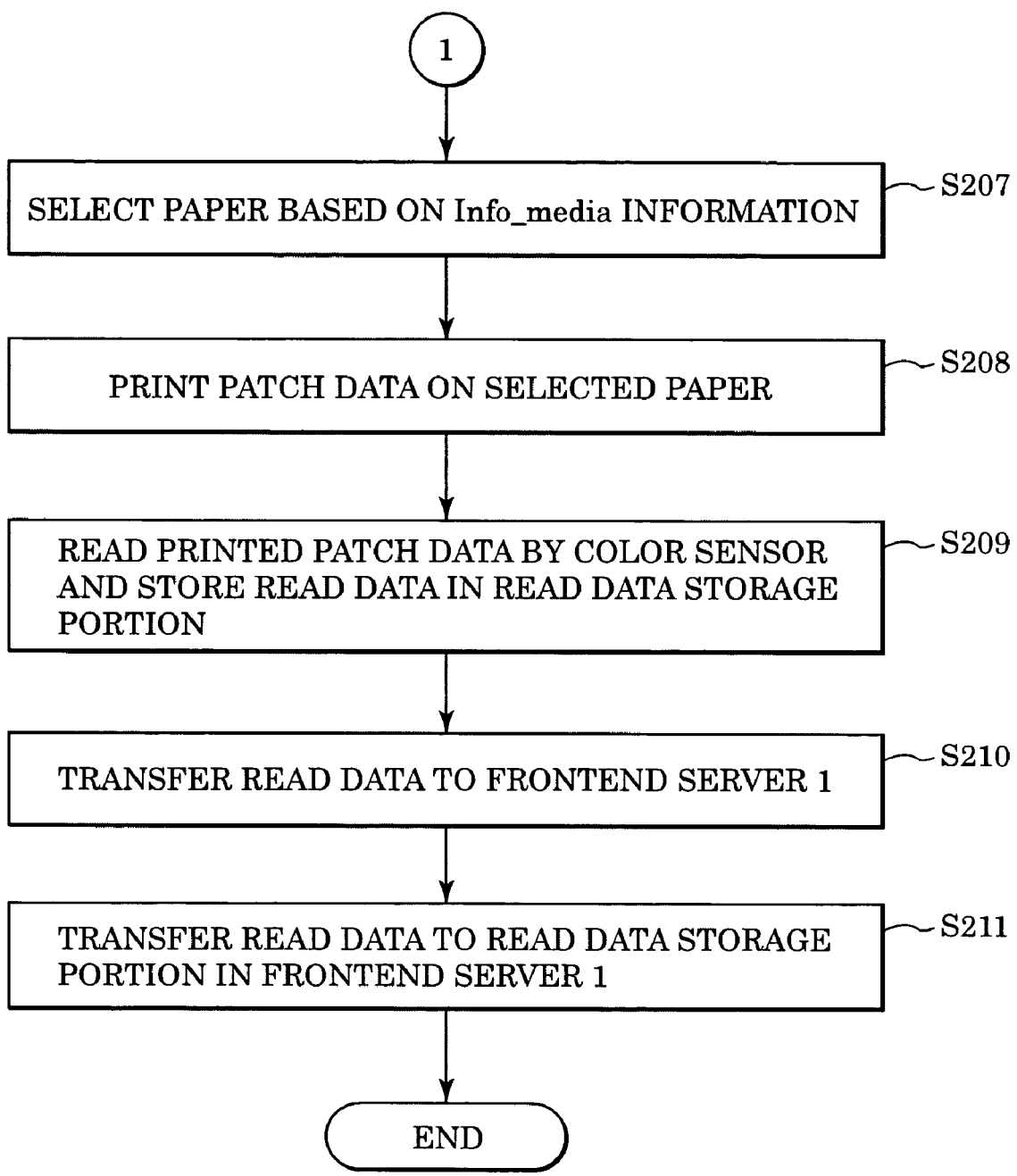
FIG. 13 is a flowchart showing detail processing for outputting patch data according to Embodiments 1-1 and 2-1 of the invention.

FIGS. 12 and 13 are flowcharts showing the detailed processing of outputting of patch data in step S106 of FIG. 11. Turning to FIG. 12, in step S200, patch data is retrieved from the patch data storage portion 17, Next, in step S201, it is determined whether the patch data has been rendered, that is, whether the patch data has been expanded to bitmap data. If the patch data has been rendered, the processing moves to step S206, which is described below. Otherwise, the patch data is analyzed by the PDL interpreter portion 12 to create intermediate data in step S202, and the processing proceeds to step S203. In step S203, the intermediate data created at step S202 is temporarily stored in the intermediate data storage portion 13, and the processing moves to step S204.

At step S204, the intermediate data having been stored at step S203 is retrieved and undergoes flow processing for patch data output, as described above with respect to FIG. 10, by the color management processing portion 16. Next, in step S205, the rendering portion 15 expands the intermediate data from step S204 to bitmap image data. Here, color matching and calibration data are not applied to patch data since the calibration one-dimensional LUT outputs a same data value as that of patch data having been input to the CMM. Flow then proceeds to step S206, where the expanded bit map image data and "Info_media" information are transferred to the printer engine 2.

The process continues in FIG. 13, where, in step S207, paper is selected in the printer engine 2 with reference to and based on the "Info_media" information. In step S208, the patch data is printed on the selected paper, and the processing moves to step S209, where under the control of the color sensor control portion 22, the printed patch data is read by the color sensor 23, and the read data is stored in the read data storage portion 24. Next, in step S210, the read data is transferred to the frontend server 1, and in step S211, in the frontend server 1, the read data is transferred to the read data storage portion 19 in the frontend server 1. The patch data output processing then ends.

Figure 14:
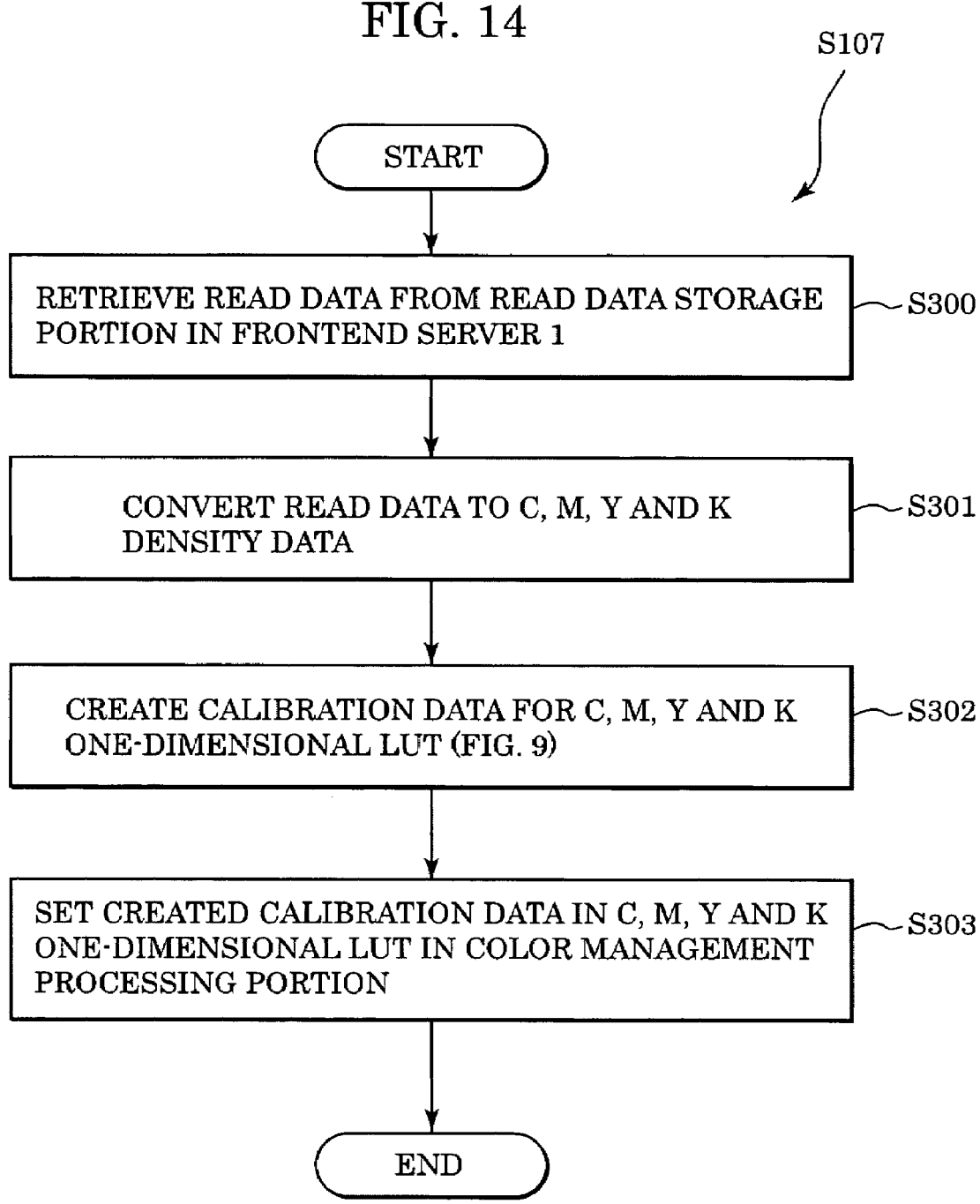
FIG. 14 is a flowchart showing detail processing for creating calibration data according to Embodiment 1-1 of the invention.

FIG. 14 is a flowchart showing detail processing of creation of calibration data in step S107 of FIG. 11. First, in step S300, the read data, which is RGB data, is retrieved from the read data storage portion 19 in the frontend server 1. Next, in step S301, the read data is converted to density data of C, M, Y and K, and the processing moves to step S302. In step S302, calibration data for a CMYK one-dimensional LUT is created by using the relationships shown in FIG. 9. Then, in step S303, the calibration data created in step S302 is set in the CMYK one-dimensional LUT in the color management processing portion 16, and the processing ends.

Figure 16:
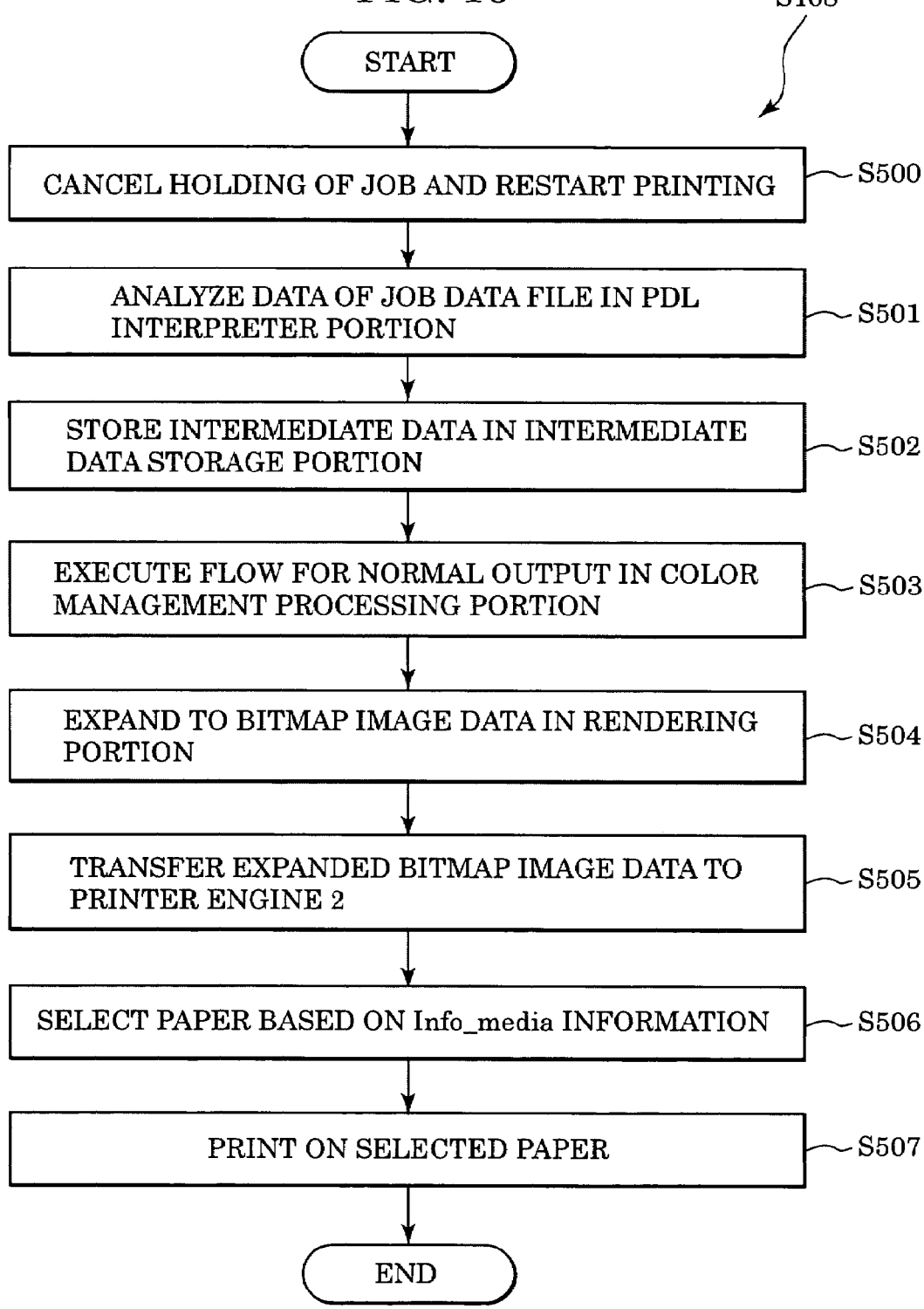
FIG. 16 is a flowchart showing detail processing for outputting job data according to Embodiment 1-1 of the invention.

FIG. 16 is a flowchart showing detail processing of output of job data in step S108 of FIG. 11. First, in step S500, the processing on the job data file, which is held in the job management portion 11A, is restarted. In step S501, the data of the job data file is analyzed in the PDL interpreter portion 12 to create intermediate data. Then, in step S502, the intermediate data created in step S501 is stored in the intermediate data storage portion 13. Next, in step S503, the intermediate data stored in the intermediate data storage portion 13 undergoes the normal processing flow of FIG. 10 for performing color patching and calibration processing on RGB or CMYK data by the color management processing portion 16.

The flow then proceeds to step S504, where the intermediate data in step S503 is expanded to bitmap image data in the rendering portion 15. In step S505, the expanded bitmap image data is transferred to the printer engine 2, and the processing moves to step S506, where the printer engine 2 selects paper based on "Info_media" information. Finally, in step S507, the data is printed on the selected paper, and the processing ends.

In this way, according to the present embodiment, under control from a remote location, calibration data can be created, and the created data can be applied to selected job data.

Embodiment 1-2

Figure 15:
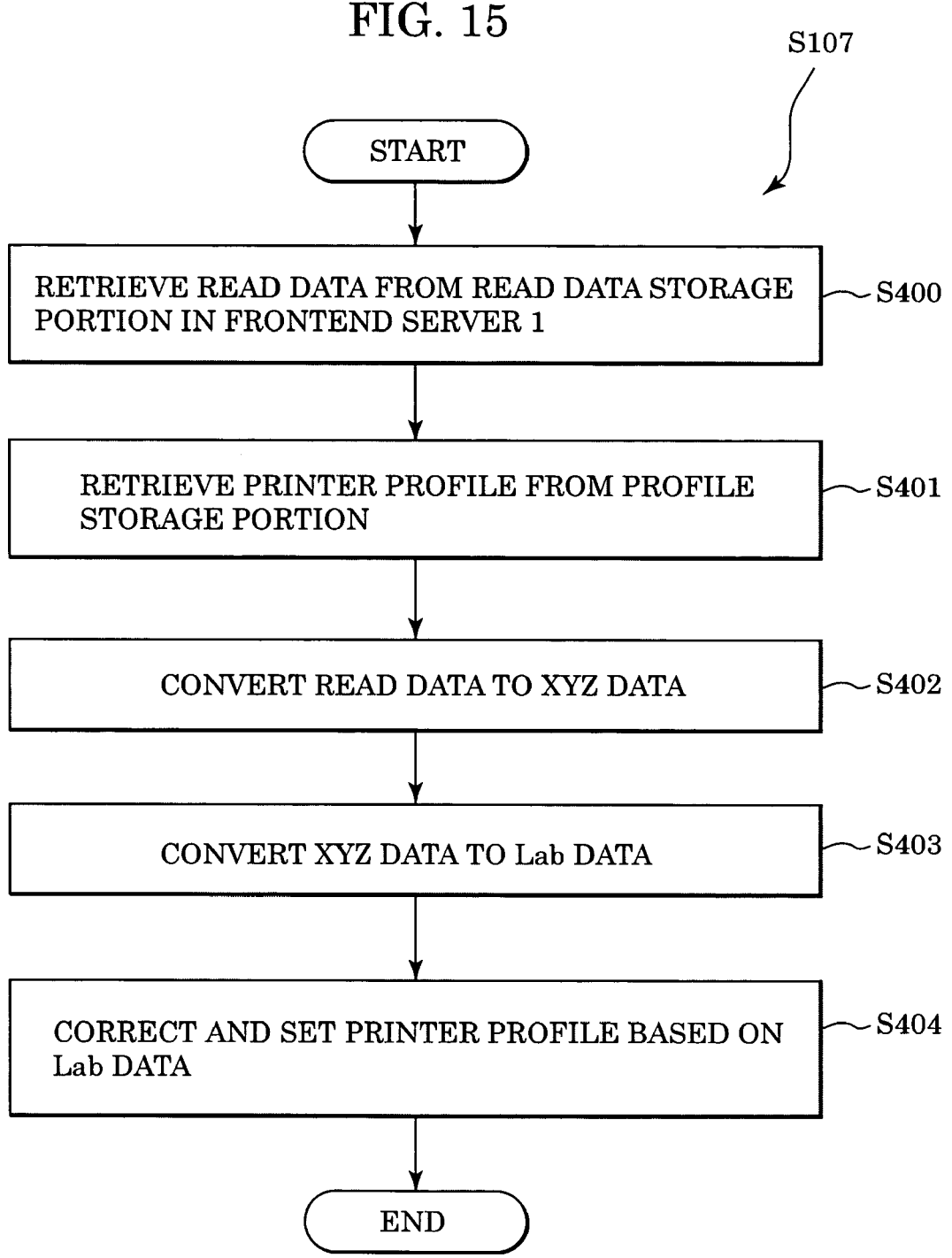
FIG. 15 is a flowchart showing detail processing for creating calibration job data according to Embodiment 1-2 of the invention.

Next, Embodiment 1-2 will be described. Embodiment 1-2 is different from Embodiment 1-1 in that the processing in FIG. 14 is replaced by processing in FIG. 15. In other words, the difference between the two embodiments is based on whether calibration data is created for a CMYK one-dimensional LUT or a printer profile is corrected. FIG. 15 is a flowchart showing detail processing of creation of calibration data at step S107 of FIG. 11.

First, in step S400 read data, which is in RGB, is retrieved from the read data storage portion 19 of the frontend server 1. Next, in step S401, a printer profile is retrieved from the profile storage portion 16A of the color management processing portion 16, and the processing moves to step S402. In step S402, the read data is converted to XYZ data based on a matrix operation of 3×3, and the processing moves to step S403. In step S403, the XYZ data resulting from the conversion in step S402 is converted to Lab data by a predetermined conversion expression, and the processing moves to step S404. In step S404, the printer profile is corrected based on the Lab data resulting from the calculation in step S403, and the printer profile is set in the profile storage portion 16A. Processing then ends. Any method of correcting a printer profile from a few colorimetry values of patch data that would enable practice of the present invention may be applied to the processing of correcting a printer profile based on Lab data.

Embodiment 1-3

While a color sensor 23 that outputs RGB data is adopted as a unit for reading output patch, according to Embodiments 1-1 and 1-2, a calorimeter, which measures chromaticity, may be used in place of the color sensor 23. Like the case in FIG. 14, control based on density values can be performed when a calibration algorithm is applied to C, M, Y and K one-dimensional LUT. Therefore, a densitometer may also be used.

According to Embodiments 1-1 and 1-2, processing for control and execution of a remote calibration is performed in the frontend server 1 connected to the printer engine 2. The same function can be also be achieved by causing a controller in the printer engine 2 to perform the control and execution. This can be accomplished by incorporating the processing function of the frontend server 1 into a controller in the printer engine 2.

Embodiment 2-1

FIGS. 1 to 13 described above are applicable to Embodiment 2-1 of the present invention.

Figure 23A:
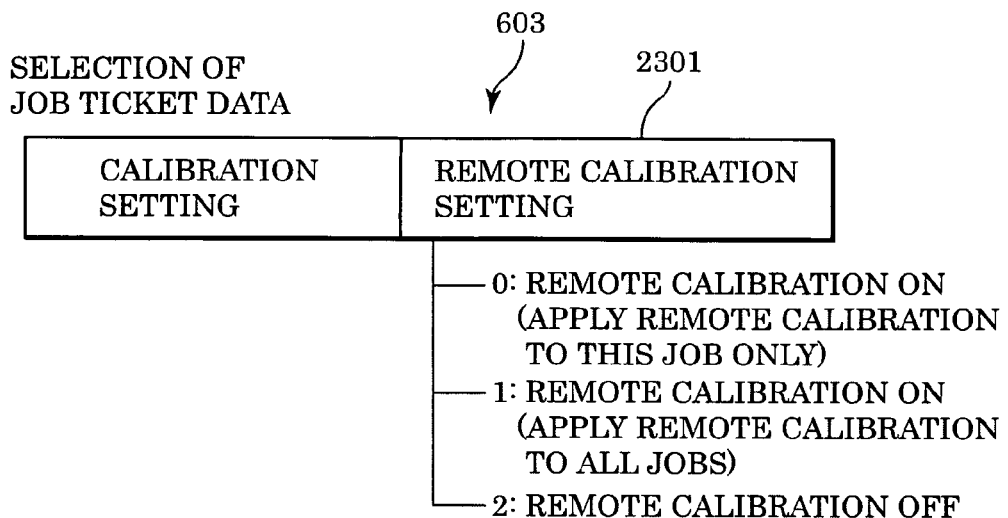
FIGS. 23A and 23B are diagrams showing settings of a remote calibration according to Embodiment 2-1 of the invention.
Figure 23B:
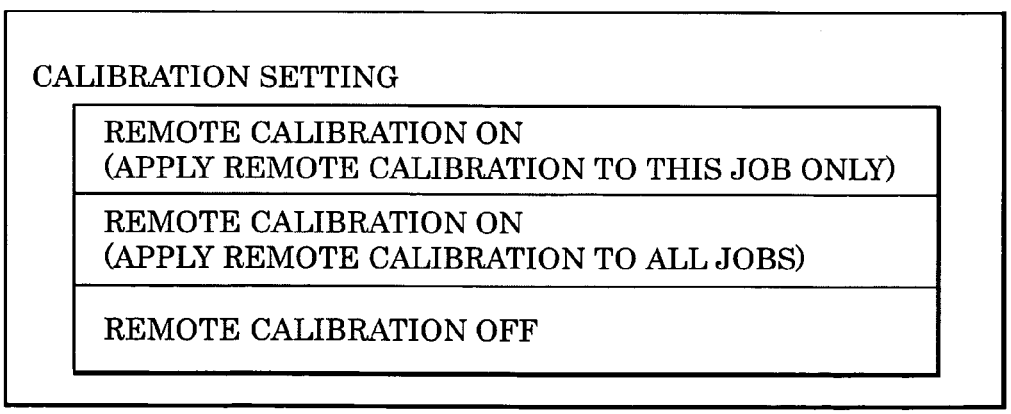

FIGS. 23A and 23B are diagrams showing remote calibration settings. FIG. 23A illustrates a remote calibration setting 2301 in the calibration setting 603 within job ticket data 501a. The remote calibration setting 2301 is selected from the following options:
   0: processing only this job to which the job ticket corresponds by using calibration data resulting from a remote calibration;
   1: processing this job to which the job ticket corresponds and subsequent jobs by using calibration data resulting from a remote calibration; and
   2: no remote calibration.

Thus, a remote calibration can be applied to only a job to which the job ticket corresponds so as not to influence other jobs. A remote calibration can also be applied to all jobs after the calibration is performed. FIG. 23B is an example of a user interface (UI) for selecting one of the above described calibration setting options.

Figure 17:
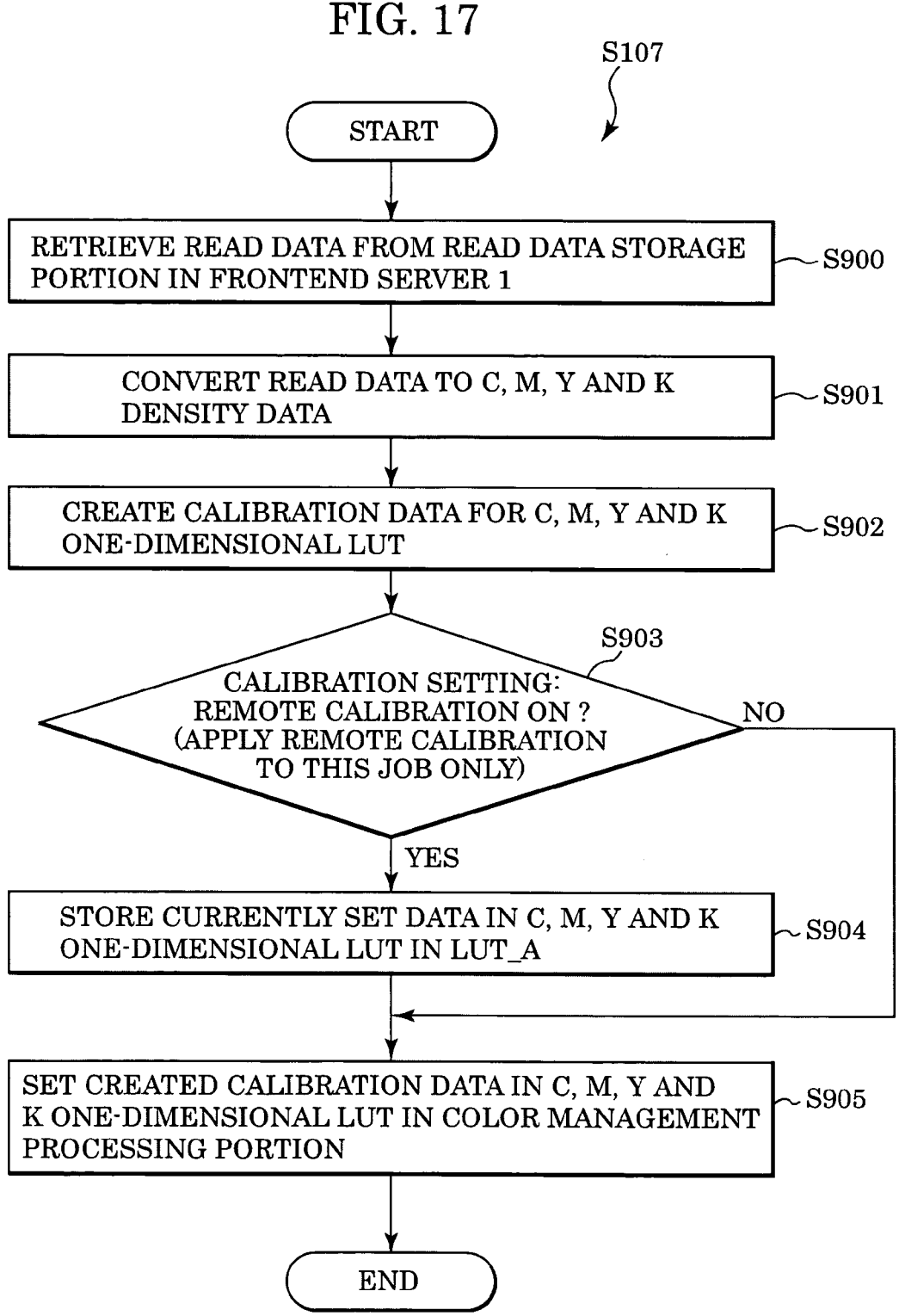
FIG. 17 is a flowchart showing detail processing for creating calibration data according to Embodiment 2-1 of the invention.

FIG. 17 is a flowchart showing the detailed processing of creation of calibration data at step S107 of FIG. 11 according to the present embodiment. Steps S900 to S902 are identical to steps S300 to S302 in FIG. 14 in the description of Embodiment 1-1, and thus a description of these steps is omitted herein.

In step S903, the calibration setting information 603, described above with respect to FIG. 23A, is retrieved, and the setting information 2301 for a remote calibration is checked. If the setting information 2301 is not "apply remote calibration to this job only", that is, the remote calibration setting is "1", the processing moves to step S905 where the calibration data created in step S902 is set in the CMYK one-dimensional LUT stored in the calibration one-dimensional LUT storage portion 16B of the color management processing portion 16. Then, the processing ends.

If, in step S903, the setting information 2301 is "apply remote calibration to this job only", that is, the remote calibration setting is "0", the processing moves to step S904, where the data currently set in the CMYK one-dimensional LUT stored in the calibration one-dimensional LUT storage portion 16B of the color management processing portion 16 is stored under the data name "LUT_A" in a system memory (not shown). Next, in step S905, the calibration data having been created in step S902 is set in the CMYK one-dimensional LUT stored in the calibration one-dimensional LUT storage portion 16B of the color management processing portion 16. Then, the processing ends.

Per the processing of FIG. 17, if the setting information 2301 for a remote calibration is "apply remote calibration to this job only", the currently set calibration data can be temporarily stored.

Figure 21:
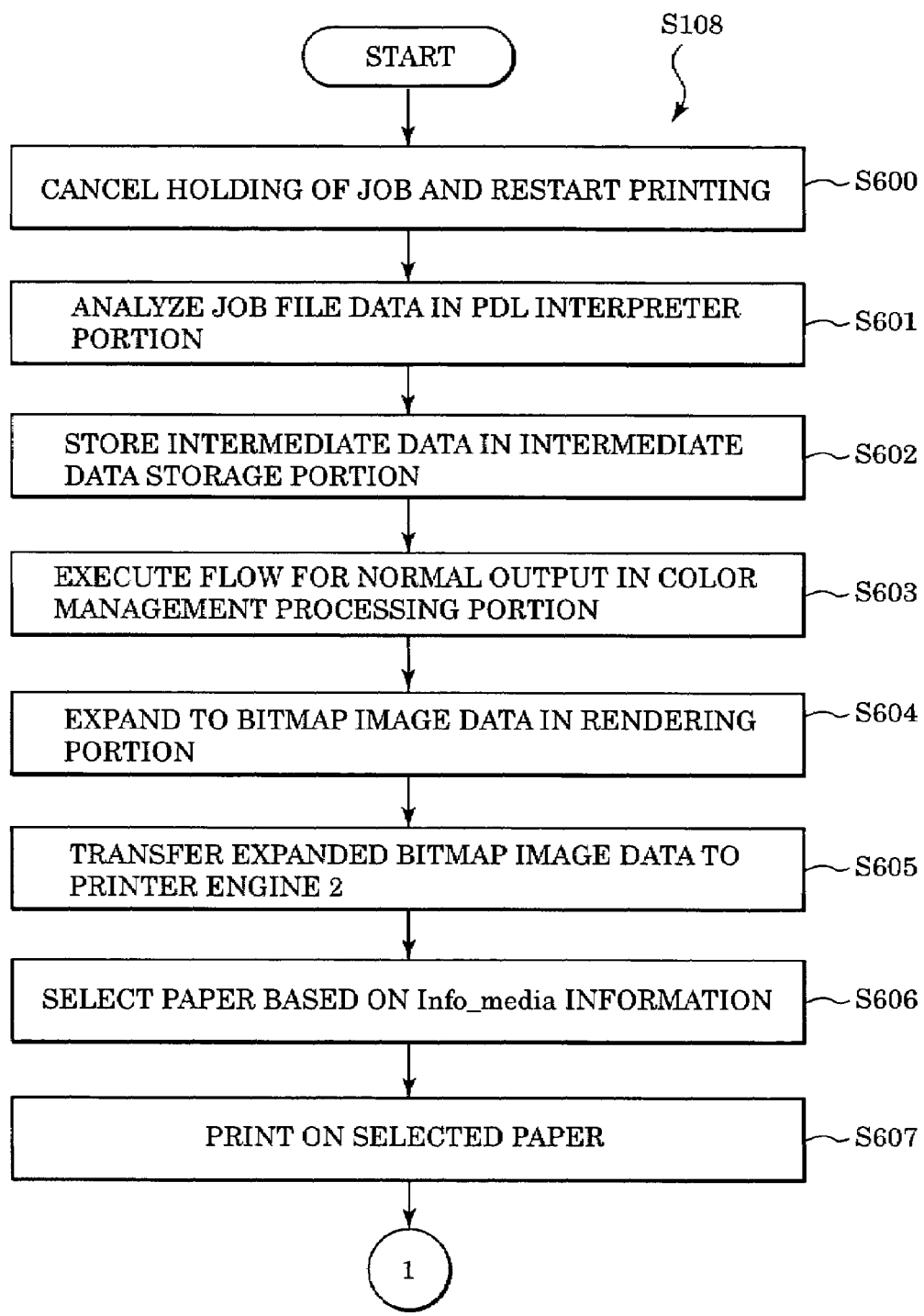
FIG. 21 is a flowchart showing detail processing for outputting job data according to Embodiment 2-1 of the invention.
Figure 22:
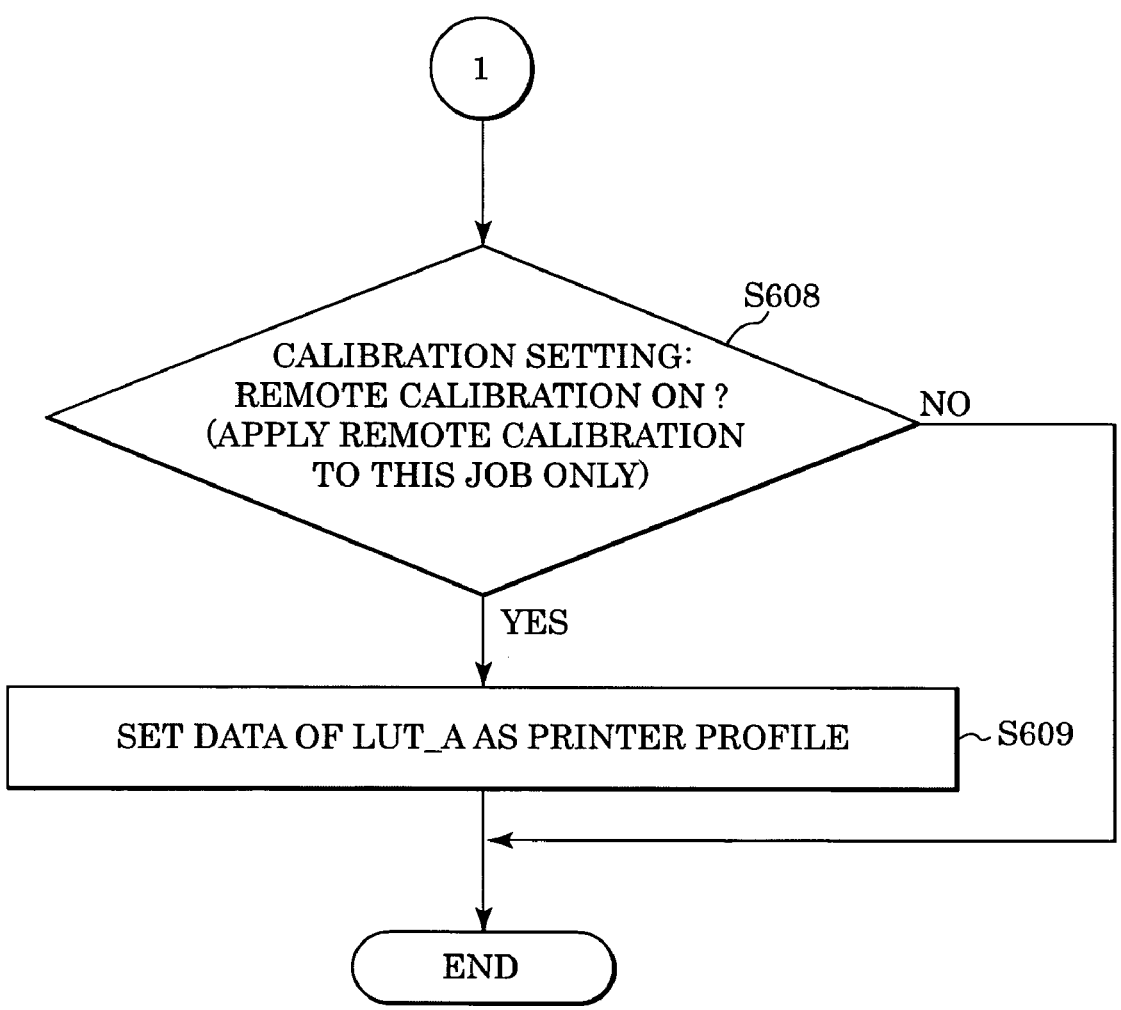
FIG. 22 is a flowchart showing detail processing for outputting job data according to Embodiment 2-1 of the invention.

FIGS. 21 and 22 are flowcharts showing the detailed processing of output of job data in step S108 of FIG. 11 according to the present embodiment. Steps S600 to S607 in FIG. 21 are the same as steps S500 to S507 in FIG. 16, and thus a detailed description of these steps is omitted herein. In step S607, the data is printed on selected paper, which is the end of the printing steps.

Turning to FIG. 22, in step S608, the calibration setting information 603, is retrieved, and the setting information 2301 for the remote calibration is checked. If the setting information 2301 for the remote calibration is not "apply remote calibration to this job only", the processing ends. If the setting information 2301 for the remote calibration is "apply remote calibration to this job only", the processing moves to step S609, where the data of "LUT_A" is set in the CMYK one-dimensional LUT stored in the calibration one-dimensional LUT storage portion 16B of the color management processing portion 16. Then, the processing ends.

Per the processing of FIGS. 21 and 22, if the setting information 2301 for a remote calibration is "apply remote calibration to this job only", the calibration data temporarily stored in "LUT_A" is reset so as to return to the state before the remote calibration is applied.

Embodiment 2-2

Next, Embodiment 2-2 will be described. Embodiment 2-2 differs from Embodiment 2-1 in that the processing of FIGS. 17, 21 and 22 is replaced by the processing of FIGS. 18, 19 and 20, respectively. In other words, as calibration processing, while a CMYK one-dimensional LUT is created and is applied according to Embodiment 2-1, a printer profile is corrected according to Embodiment 2-2.

Figure 18:
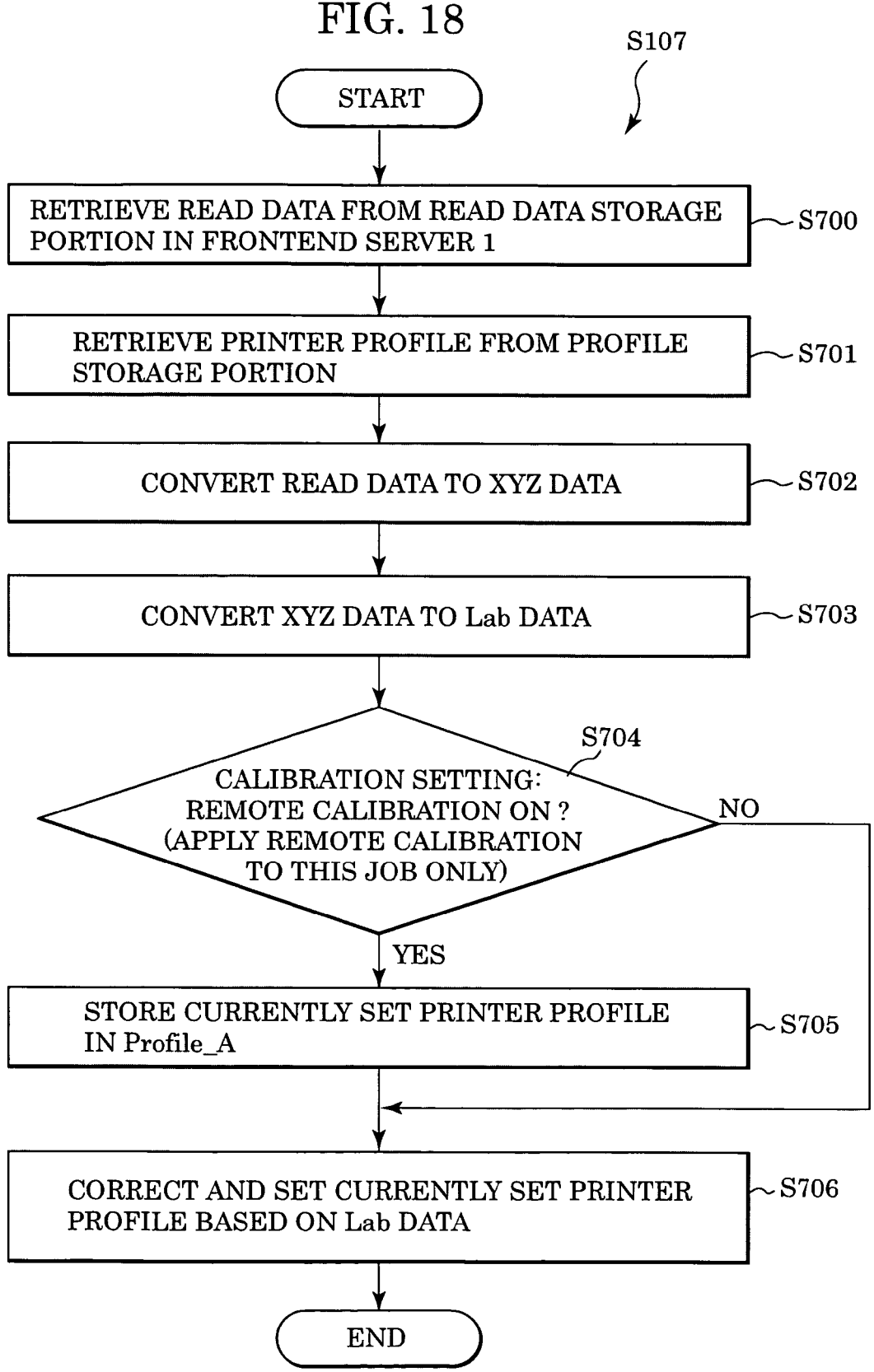
FIG. 18 is a flowchart showing detail processing for creating calibration data according to Embodiment 2-2 of the invention.

FIG. 18 is a flowchart showing the detailed processing of creation of calibration data in step S107 of FIG. 11 according to the present embodiment. More specifically, a method of correcting a printer profile will be described. First, in step S700, read data, which is in RGB, is retrieved from the read data storage portion 19 of the frontend server 1, and the processing moves to step S701. In step S701, a printer profile is retrieved from the profile storage portion 16A of the color management processing portion 16, and the processing moves to step S702. In step S702, the read data is converted to XYZ data based on a matrix operation of 3×3, and the processing moves to step S703. In step S703, the XYZ data resulting from the conversion in step S702 is converted to Lab data by a predetermined conversion expression, and the processing moves to step S704.

In step S704, the calibration setting information 603 is retrieved, and the setting information 2301 for a remote calibration is checked. If the setting information 2301 is not "apply remote calibration to this job only", that is, the remote calibration setting is "1", the processing moves to step S706 where the printer profile is corrected based on the Lab data resulting from the calculation in step S703, and the printer profile is set in the profile storage portion 16A. Then, the processing ends.

If, in step S704 the setting information 2301 is "apply remote calibration to this job only", that is, the remote calibration setting is "0", the processing moves to step S705 where the data currently set in the profile storage portion 16A of the color management processing portion 16 is stored under the data name "Profile_A" in a system memory (not shown) and the processing moves to step S706. In step S706, the printer profile is corrected based on Lab data resulting from the calculation in step S703, and the printer profile is set in the profile storage portion 16A. Then, the processing ends.

Per the processing of FIG. 18, if the setting information 2301 for a remote calibration is "apply remote calibration to this job only", the currently set calibration data can be temporarily stored.

Figure 19:
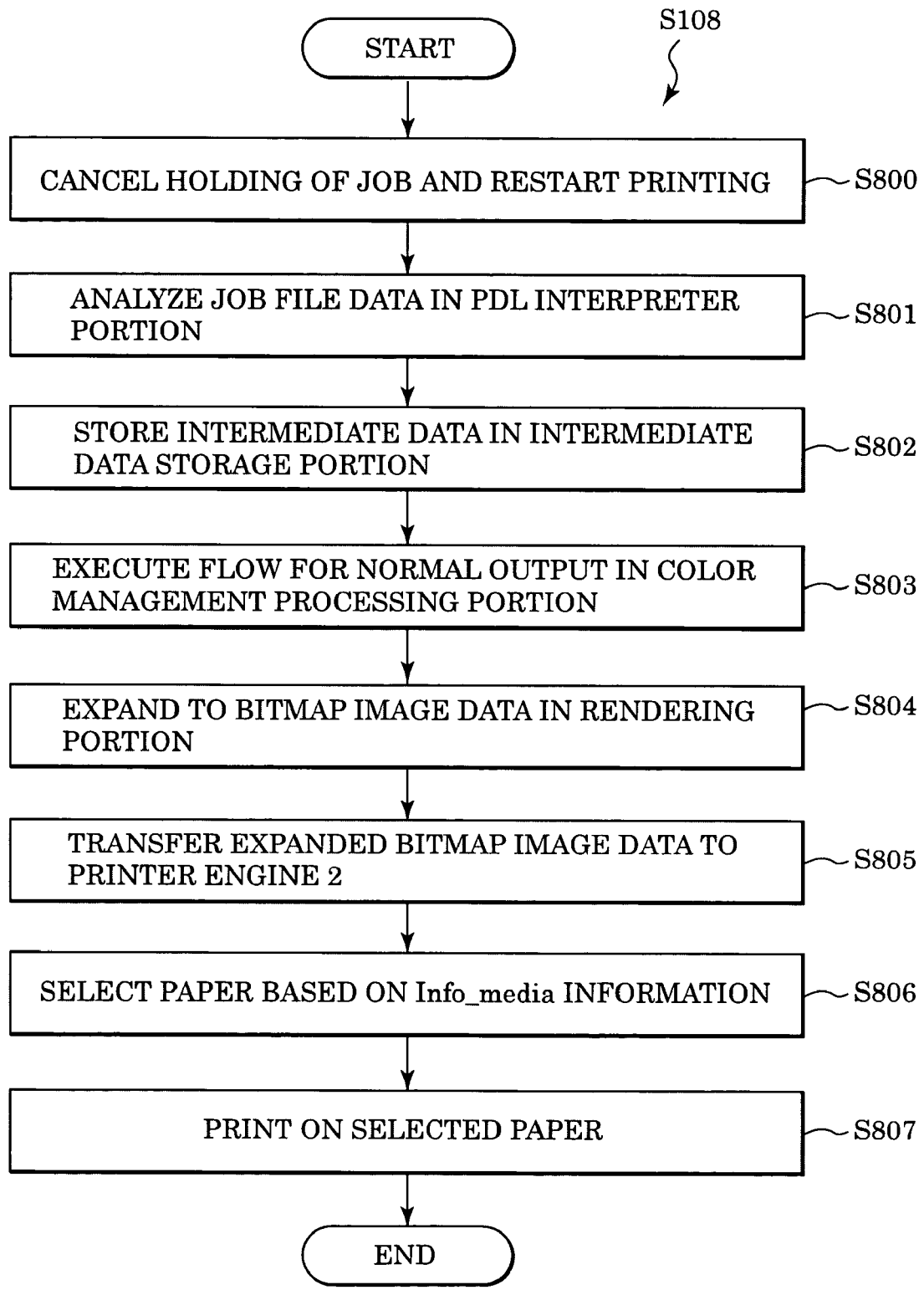
FIG. 19 is a flowchart showing detail processing for outputting job data according to Embodiment 2-2 of the invention.
Figure 20:
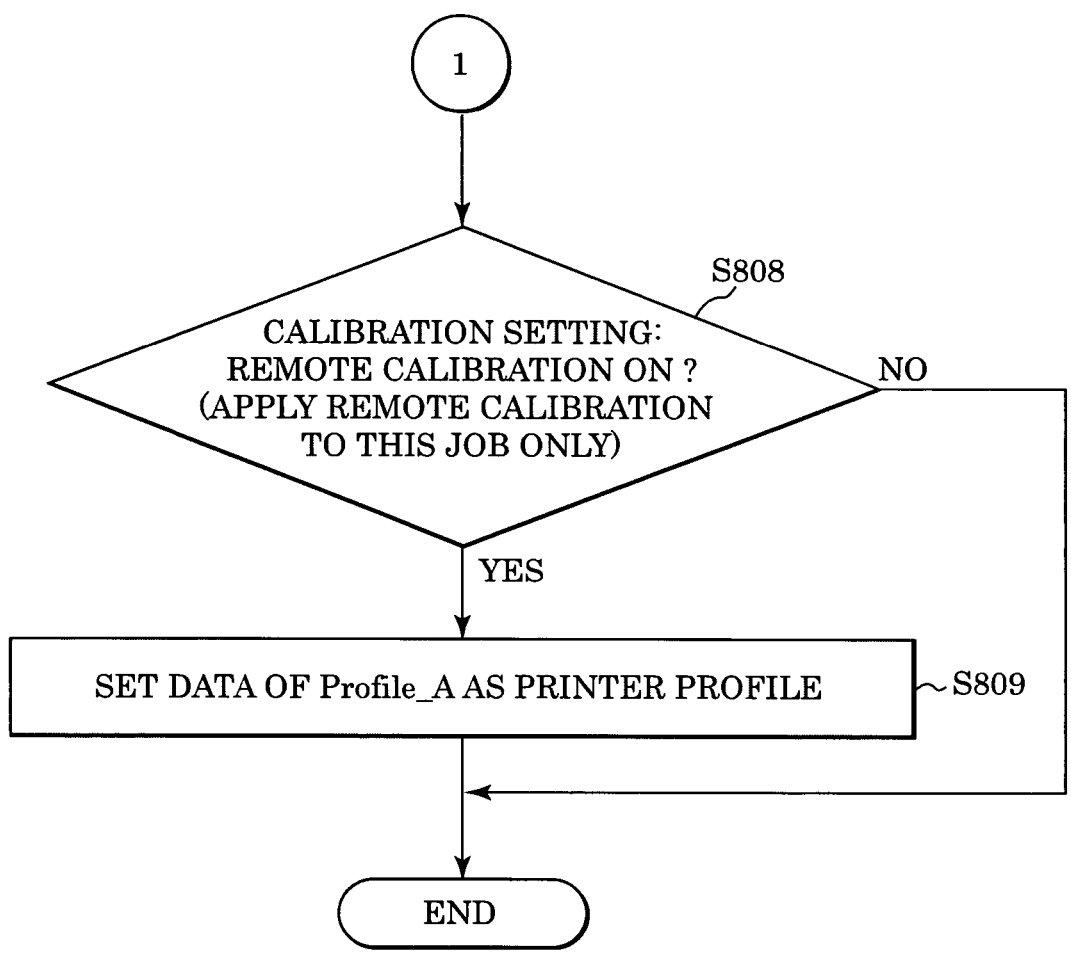
FIG. 20 is a flowchart showing detail processing for outputting job data according to Embodiment 2-2 of the invention.

FIGS. 19 and 20 are flowcharts showing the detailed processing of output of job data in step S108 of FIG. 11 according to the present embodiment. Steps S800 to S807 are the same as steps S600 to S607 in FIG. 21 and steps S500 to S507 in FIG. 16, and thus a detailed description of these steps is omitted herein. In step S807, the data is printed on selected paper, which is the end of the printing steps.

Turning to FIG. 20, in step S808, the calibration setting information 603 is retrieved, and the setting information 2301 for the remote calibration is checked. If the setting information 2301 for the remote calibration is not "apply remote calibration to this job only", the processing ends. If the setting information 2301 for the remote calibration is "apply remote calibration to this job only", the processing moves to step S809 where the data of "Profile_A" is set in the printer profile stored in the profile storage portion 16A of the color management processing portion 16. Then, the processing ends.

Per the processing of FIGS. 19 and 20, if the setting information 2301 for a remote calibration is "apply remote calibration to this job only", the calibration data temporarily stored under profile_A is reset so as to return to the state before the remote calibration is applied.

As described above, a calibration can be automatically performed on a remote color printer that is being remotely controlled. In particular, when multiple clients request one remote color printer to process jobs, the ON/OFF of remotely performing a calibration can be selected for each of the jobs or for each of the clients. When different jobs are output from multiple clients, a remote calibration is applied only to a job from a specific client. Thus, the job can be controlled so as not to affect jobs from other clients.

Embodiment 2-3

While a color sensor 23 that outputs RGB is adopted as a unit for reading output patch, according to Embodiments 2-1 and 2-2, a colorimeter may be used instead which can measure density and chromaticity. As illustrated in FIG. 17, control based on density values can be performed when a calibration algorithm is applied to C, M, Y and K one-dimensional LUT. As such, a densitometer can be also used.

According to Embodiments 2-1 and 2-2, processing for control and execution of a remote calibration is performed in the frontend server 1 connected to the printer engine 2. The same function can be also achieved by causing a controller in the printer engine 2 to perform the control and execution. This can be accomplished by incorporating the processing function of the frontend server 1 into a controller in the printer engine 2.

Embodiment 3-1

FIGS. 1 to 11 and FIG. 16 described above are applicable to Embodiment 3-1 of the present invention.

Figure 29:
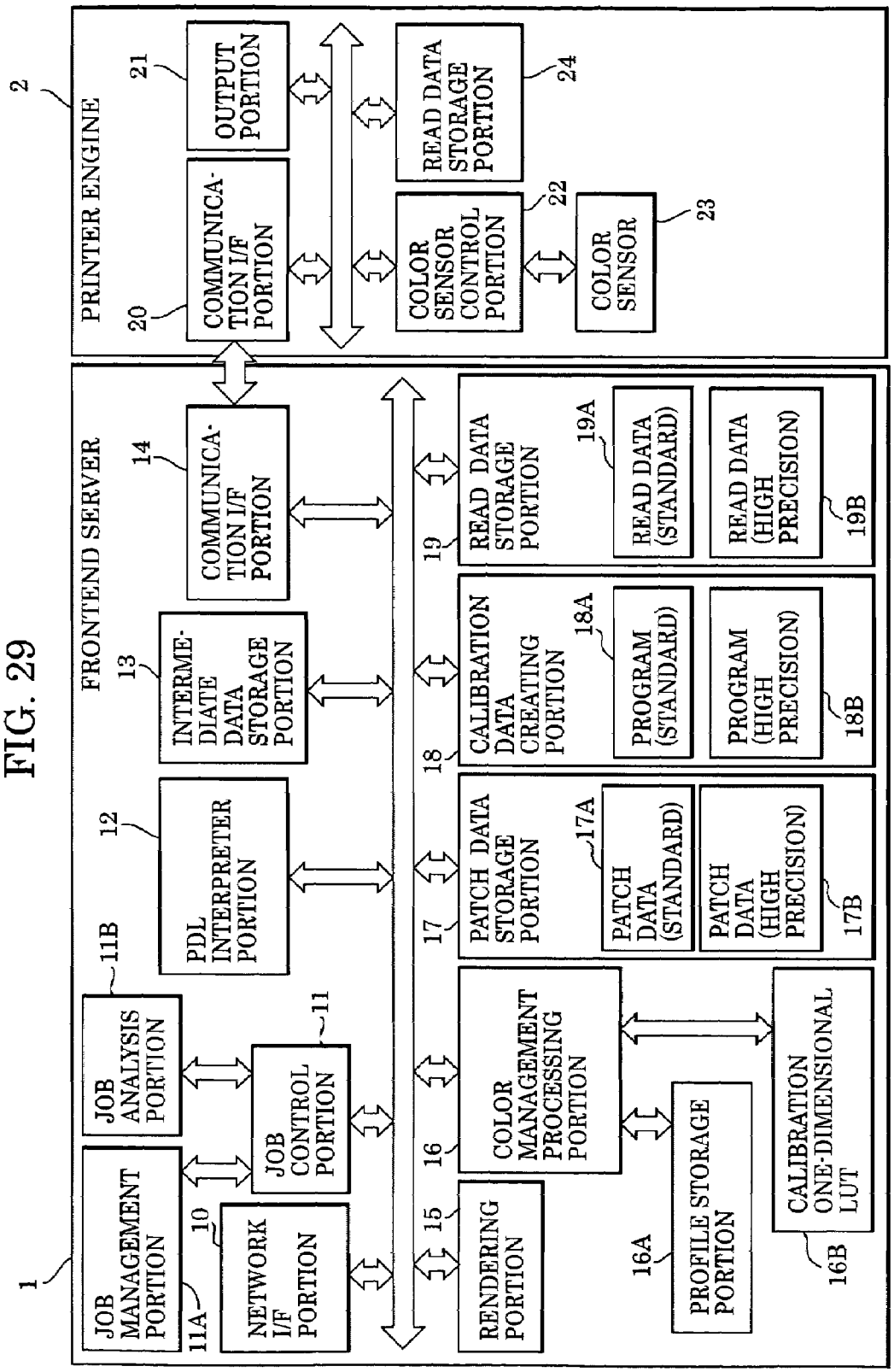
FIG. 29 is a diagram showing a configuration of a printing system according to Embodiment 3-1 of the invention.

FIG. 29 is a diagram showing a configuration of a printing system according to the present embodiment, including the printer engine 2 and the frontend server 1. The frontend server 1 in FIG. 29 is the same as the frontend server 1 in FIG. 2, with the following differences.

First, patch data storage portion 17 includes patch data (standard) 17A and patch data (high precision) 17B. Patch data (standard) 17A is used for executing a calibration algorithm with standard calibration precision, while patch data (high precision) 17B is used for executing a calibration algorithm with high calibration precision. More specifically, patch data (standard) 17A is patch data (standard; CMYK primary colors) shown in FIG. 7A. The patch data (high precision) 17B includes patch data (standard; CMYK primary colors) shown in FIG. 7A and patch data (high precision; CMYK multi-order colors) in FIG. 7B.

In addition, calibration data creating portion 18 of the frontend server 1 of the present embodiment includes calibration program (standard) 18A and program (high precision) 18B. The calibration program (standard) 18A is used for executing a calibration algorithm, with the standard calibration precision during calibration creating processing. The calibration program (high precision) is used for executing a calibration program with high calibration precision during calibration creation processing.

Read data storage portion 19 of the present embodiment includes read data (standard) 19A and read data (high precision) 19B. The read data (standard) 19A is used for executing a calibration algorithm with standard calibration precision. The read data (high precision) 19B is used for executing a calibration algorithm with a high calibration precision.

Figure 30A:
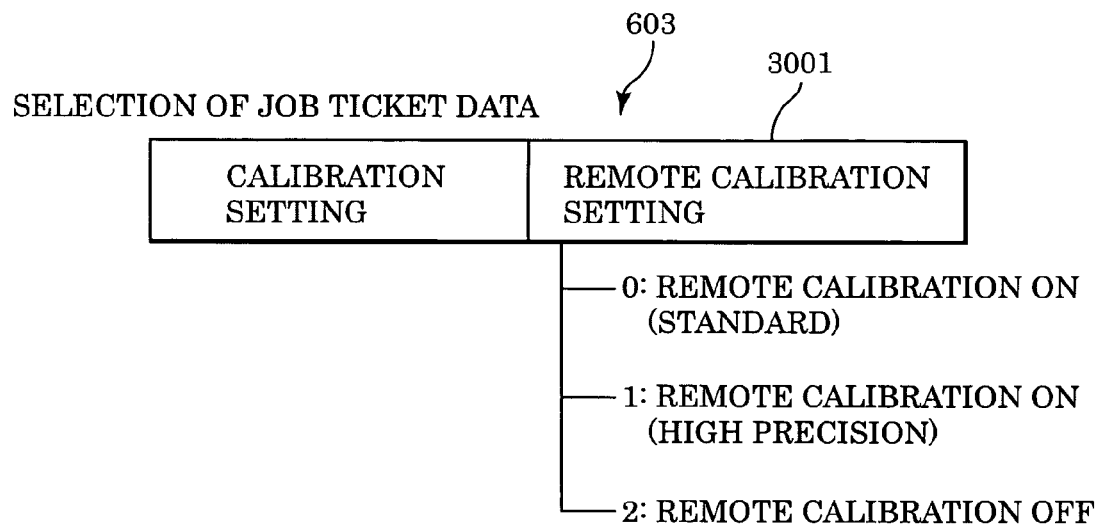
FIGS. 30A and 30B are diagrams showing settings for a remote calibration according to Embodiment 3-1 of the invention.
Figure 30B:
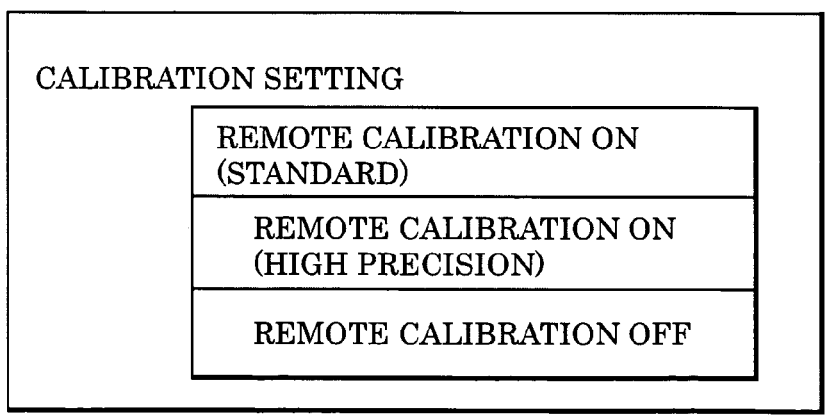
Figure 31:
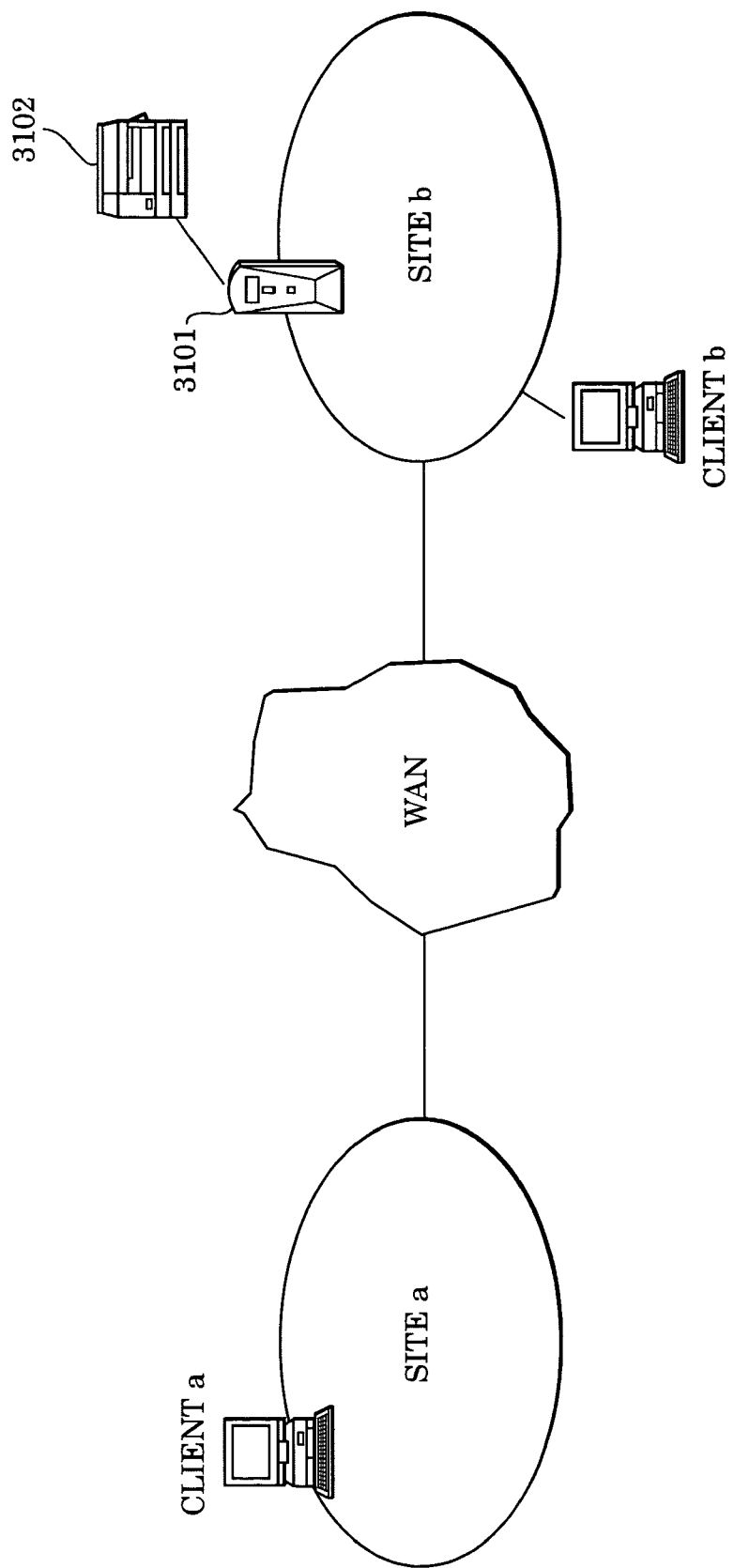
FIG. 31 is a diagram showing a construction of a conventional communication network system.

FIGS. 30A and 30B are diagrams showing remote calibration settings. FIG. 30A illustrates a remote calibration setting 3001 in the calibration setting 603 within the job ticket data 501a. The remote calibration setting 3001 is selected from the following options:

0: performing remote calibration processing with standard precision on job to which the job ticket corresponds;
1: performing remote calibration processing with high precision on job to which the job ticket corresponds; and
2: no remote calibration.

Thus, different remote calibration processes, each with different calibration precision levels, can be selected for a job to which a given job ticket corresponds. FIG. 30B is an example of a user interface (UI) for selecting one of the above described calibration setting options.

Figure 24:
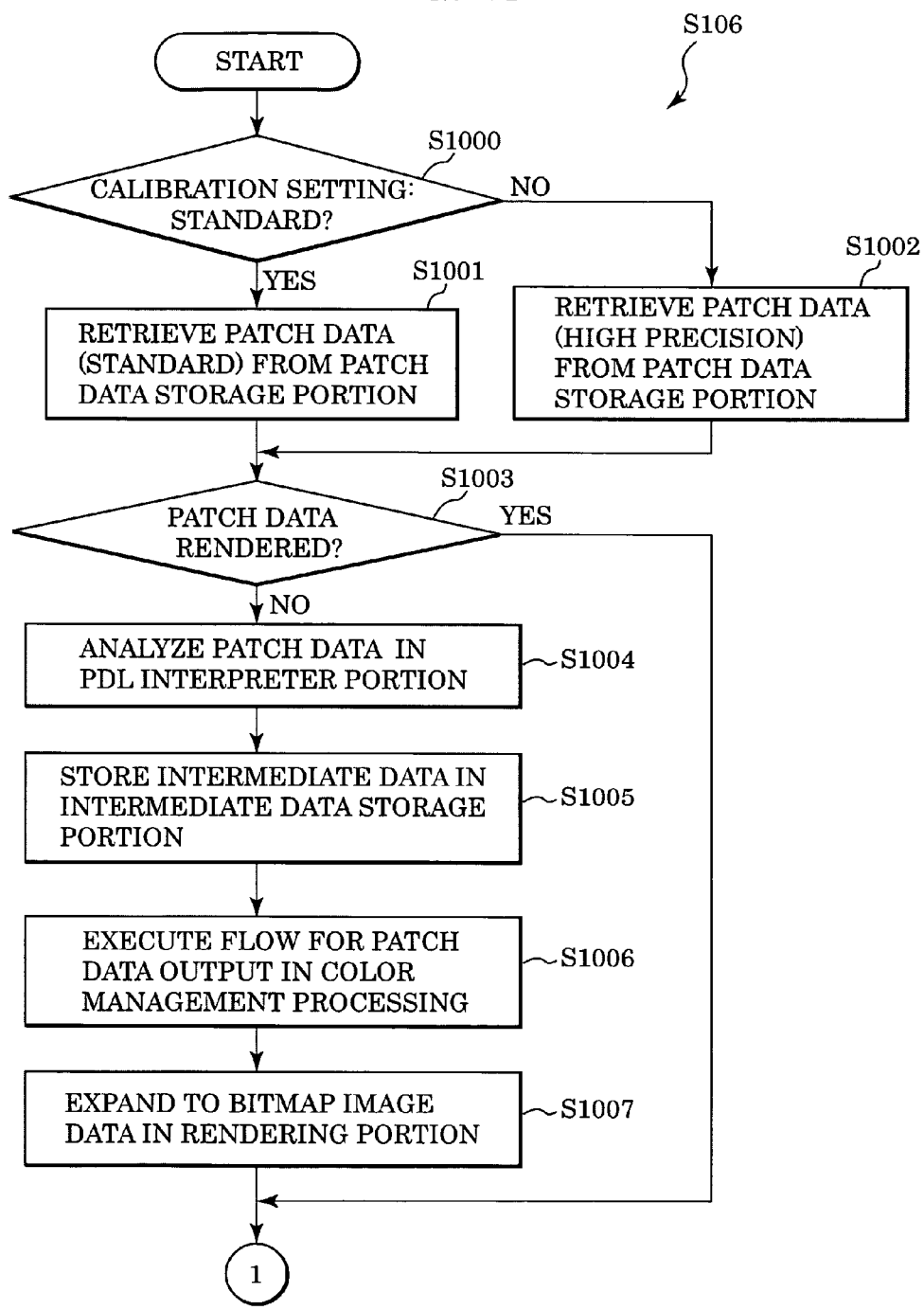
FIG. 24 is a flowchart showing detail processing for outputting patch data according to Embodiment 3-1 of the invention.
Figure 25:
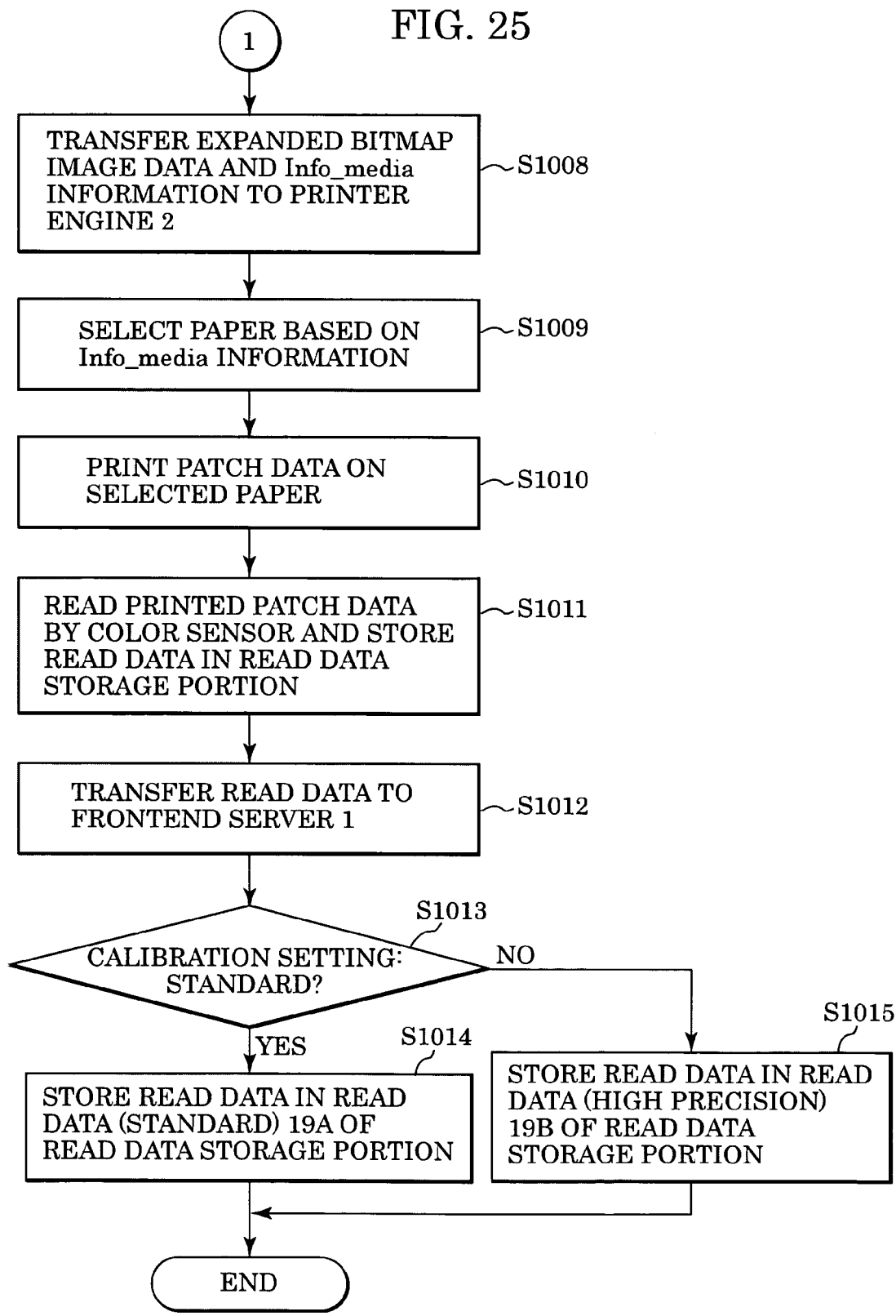
FIG. 25 is a flowchart showing detail processing for outputting patch data according to Embodiment 3-1 of the invention.

FIGS. 24 and 25 are flowcharts showing the detailed processing of output of patch data in step S106 of FIG. 11 according to the present embodiment. Turning to FIG. 24, in step S1000, the calibration setting information 603, which was described with reference to FIG. 30A, is retrieved, and the setting information 3001 for a remote calibration is checked to determine whether calibration processing with standard level precision is performed.

If, in step S1000, calibration processing with standard level precision is not being performed, the processing moves to step S1002, where the patch data (high precision) 17B is retrieved from the patch data storage portion 17, and the processing moves to step S1003. If, in step S1000, it is determined that calibration processing is performed with standard level precision, the processing moves to step S1001 where the patch data (standard) 17A is retrieved from the patch data storage portion 17. Then, the processing moves to step S1003.

Steps S1003 to 1012 in FIG. 25 are the same as steps S201 to 210 in FIG. 12, thus, a detailed description of these steps is omitted herein. At step S1012, read data is transferred to the frontend server 1, and the processing moves to step S1013.

In step S1013, in the frontend server 1, the calibration setting information 603, which was described with reference to FIG. 30A, is retrieved, and the setting information 3001 for a remote calibration is checked to determine whether calibration processing with standard level prevision is performed. If it is determined that calibration processing with standard level precision is not performed, the processing moves to step S1015 where the read data is stored in the read data (high precision) 19B of the read data storage portion 19, and the processing ends. If it is determined that calibration processing with standard level precision is performed, the processing moves to step S1014 where the read data is stored in the read data (standard) 19A of the read data storage portion 19. Then, the processing ends.

Figure 26:
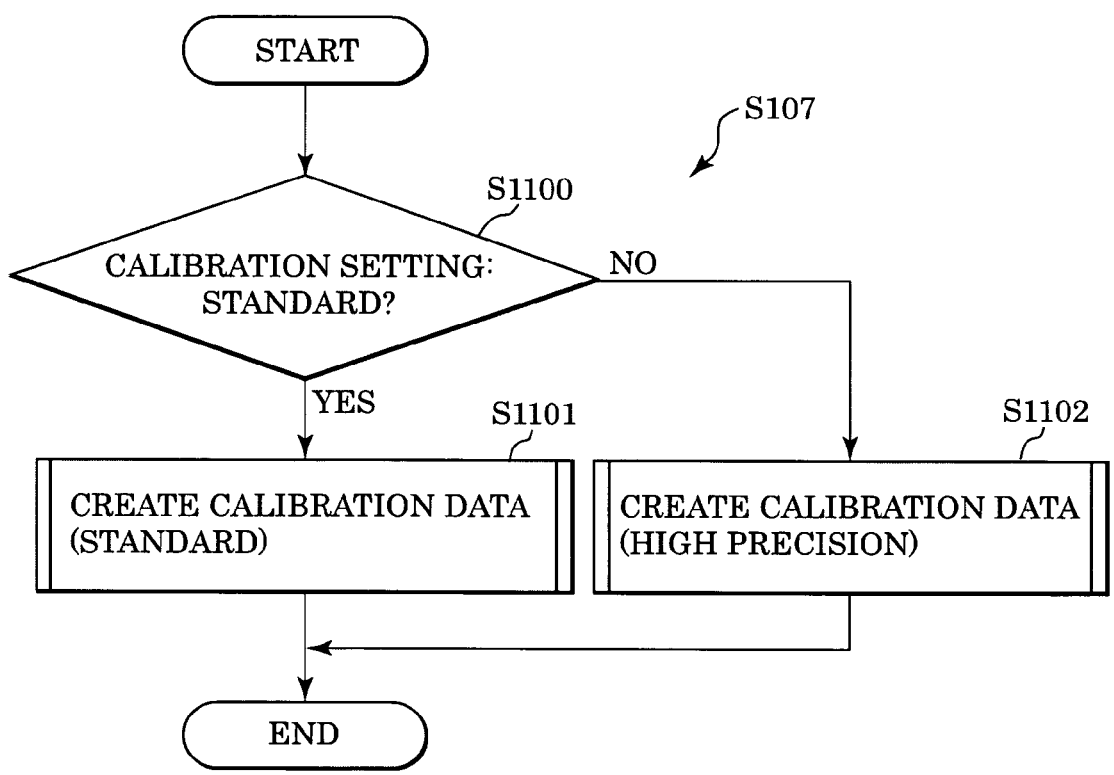
FIG. 26 is a flowchart showing detail processing for creating calibration data according to Embodiment 3-1 of the invention.

FIG. 26 is a flowchart showing the detailed processing of creation of calibration data in step S107 of FIG. 11 according to the present embodiment. In step S1100, the calibration setting information 603, which was described with reference to FIG. 30A, is retrieved, and the setting information 3001 for the remote calibration is checked to determine whether calibration processing with standard level precision is performed. If it is determined that the calibration processing with standard level precision is not performed, the processing moves to step S1102 where the calibration algorithm program 18B with the high level precision is executed to create calibration data, and the processing ends. If it is determined that calibration processing with standard level precision is performed, the processing moves to step S1101 where the calibration algorithm program 18A with the standard level precision is performed to create calibration data, and the processing ends.

Figure 27:
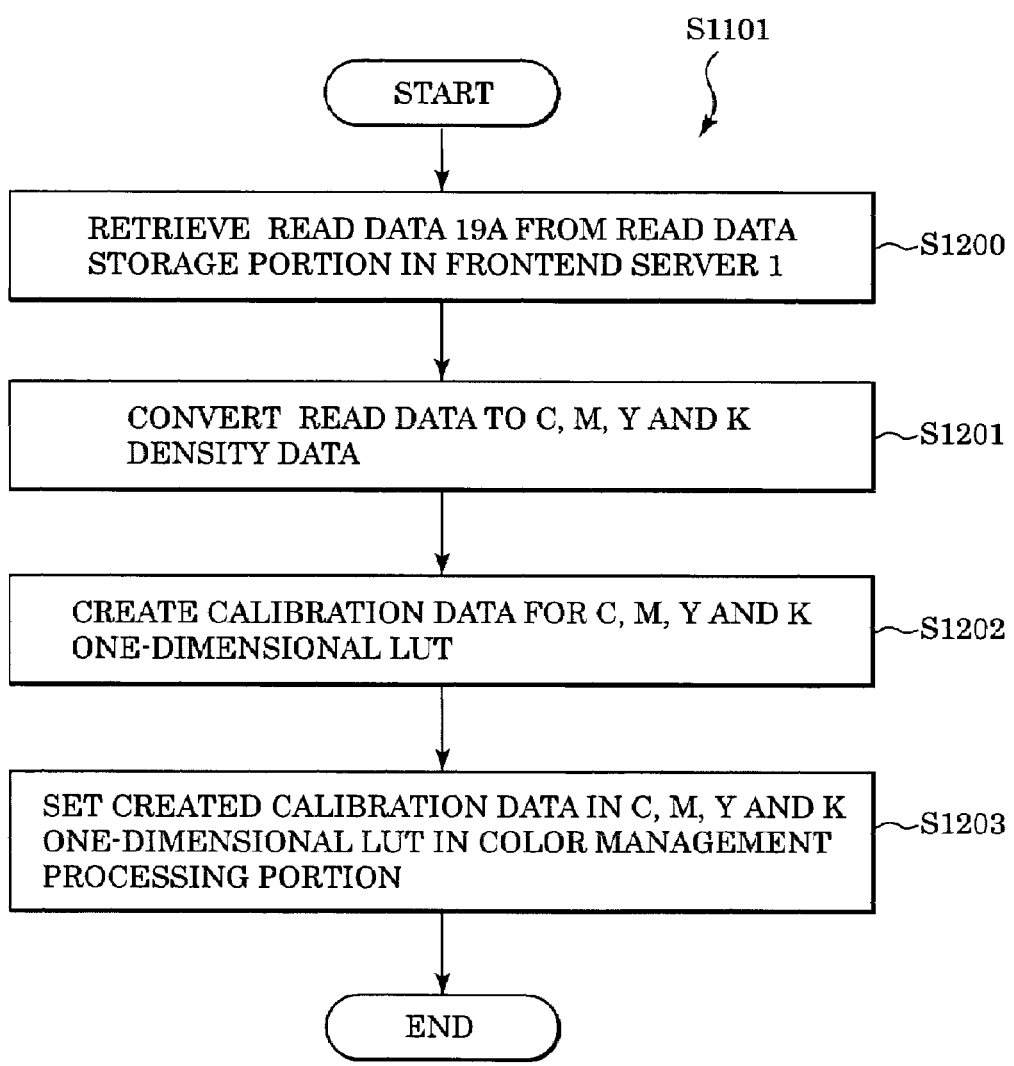
FIG. 27 is a flowchart showing detail processing for creating calibration data (standard) according to Embodiment 3-1 of the invention.

FIG. 27 is a flowchart showing the detailed processing of creation of calibration data (standard) at step S1101 in FIG. 26. First, in step S1200, read data, which is RGB data, is retrieved from the read data storage portion 19A of the frontend server 1, and the processing moves to step S1201. Steps S1201 to 1203 are the same as steps S301 to 303 in FIG. 14, thus a detailed description of these steps is omitted herein.

Per the processing of FIG. 27, when the setting information 3001 for a remote calibration is "standard", the calibration data created by the calibration algorithm with standard level precision can be set.

Figure 28:
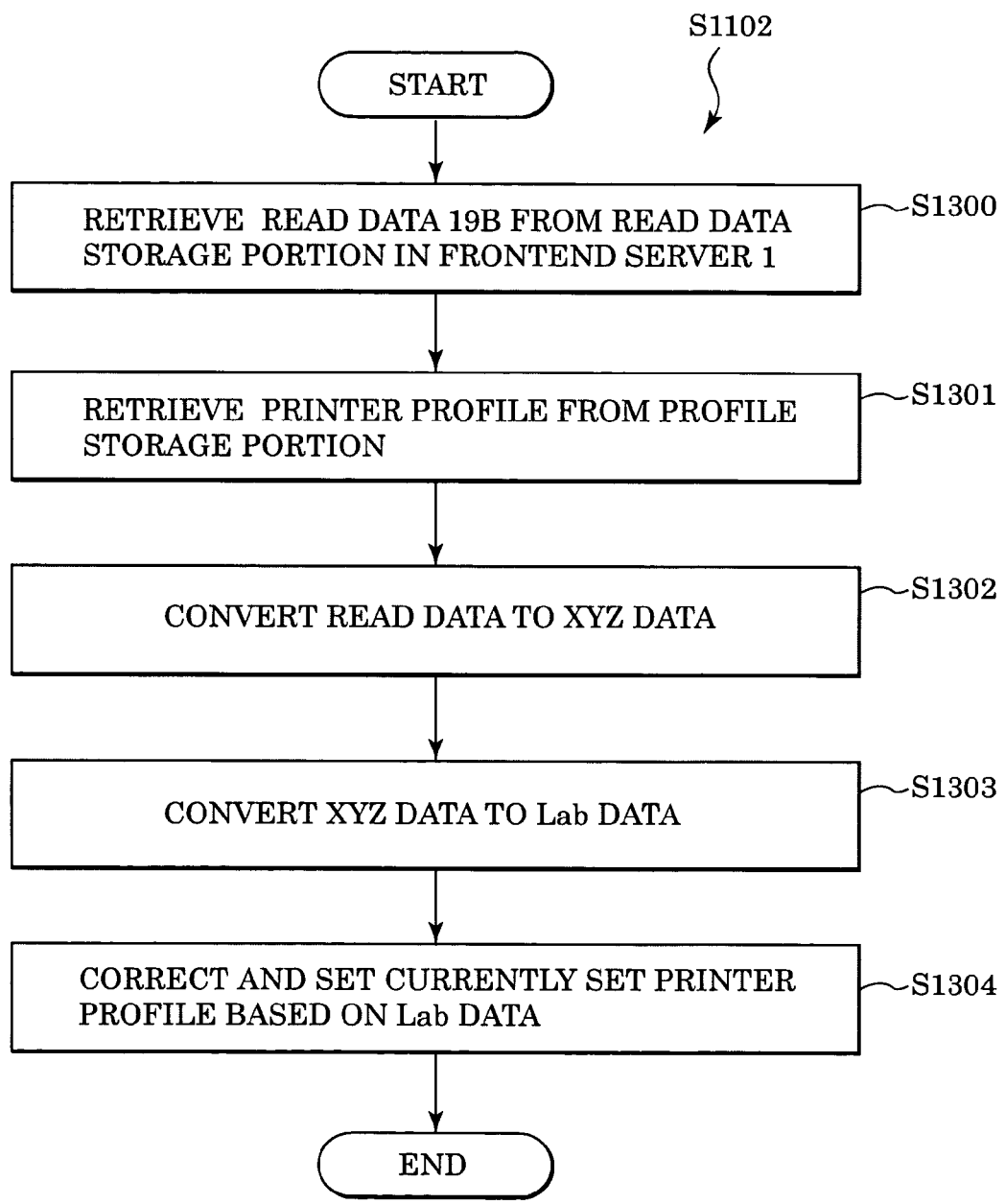
FIG. 28 is a flowchart showing detail processing for creating calibration data (high precision) according to Embodiment 3-1 of the invention.

FIG. 28 is a flowchart showing the detailed processing of creation of calibration data (high precision) at step S1102 in FIG. 26. First, in step S1300, read data, which is RGB data, is retrieved from the read data storage portion 19B of the frontend server 1, and the processing moves to step S1301. Steps S1301 to 1304 are the same as steps S401 to 404 in FIG. 15, and thus a detailed description of these steps is omitted herein.

Per the processing of FIG. 28, when the setting information 3001 for a remote calibration is "high precision", the calibration data created by the calibration algorithm with higher precision than standard precision can be set by correcting the currently set printer profile.

Embodiment 3-2

While a color sensor 23 that outputs RGB data is adopted as a unit for reading output patch, according to Embodiment 3-1, a colorimeter, which measures density and chromaticity may be used instead. Like the case in FIG. 27, control based on density values can be performed when a calibration algorithm is applied to C, M, Y and K one-dimensional LUT. Therefore, a densitometer may also be used.

According to Embodiment 3-1, processing for control and execution of a remote calibration is performed in the frontend server 1 connected to the printer engine 2. The same function can be also be achieved by causing a controller in the printer engine 2 to perform the control and execution. This can be accomplished by incorporating the processing function of the frontend server 1 into a controller in the printer engine 2.

As described above, a calibration can be performed by selecting one of multiple kinds of calibration with different precision levels. In particular, setting both the calibration setting 2301 in FIG. 23 and the calibration setting 3001 in FIG. 30 can be performed. In this instance, the multiple kinds of calibration include:

00: standard remote calibration is performed with remote calibration ON (applicable to this job only);
01: high precision remote calibration is performed with remote calibration ON (applicable to this job only);
02: standard remote calibration is performed with remote calibration ON (applicable to all jobs);
03: high precision remote calibration is performed with remote calibration ON (applicable to all jobs); and
04: remote calibration OFF.

When 02 or 03 is selected and a print command is issued from a client, e.g., Client B 1 in Site B 6, within a predetermined period of time, the client can be notified of the fact that the application of a calibration with 02 or 03 results in a printed matter having a different color from the printed matter printed before a calibration with 02 or 03 is applied. A method of the notification may include storing the fact that processing with 02 or 03 has been performed in a frontend server 1 or a printer engine 2, and, in response to a print command from a client in Site B 6 within a predetermined period of time, which is measured by a timer, sending a command for causing a PC of the client to display a message indicating the fact that the color may change.

Other Embodiments

The present invention can be achieved by supplying a system or an apparatus with a storage or recording medium storing computer-executable process steps (program code) of software implementing the functions of the above-described embodiments, and reading and executing the computer-executable process steps stored in the storage medium by a computer, or a CPU or MPU of the system or apparatus. In this case, the computer-executable process steps read from the storage medium implements the functions of the above-described embodiments, and the computer-executable process steps can be written on various storage media such as a compact disc (CD), a memory disc (MD), or a memory card.

Execution of the computer-executable process steps read by a computer can implement the functions of the above-described embodiments. Furthermore, based on commands from the computer-executable process steps, an operating system (OS), operating on a computer may perform a part or all of actual processing so that the functions of the above-described embodiments can be implemented by the processing.

Furthermore, after the computer-executable process steps read from a storage medium are written in a function extension card installed in a computer or in a memory included in a function extension unit connecting to a computer, a CPU, for example, included in the function extension card or function extension unit may perform a part or all of actual processing so that the functions of the above-described embodiments can be implemented by the processing.

While the present invention has been described with reference to what are presently considered to be the embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2003-400742 filed on Nov. 28, 2003, which is hereby incorporated by reference herein.

What is claimed is:
1. An image processing method, comprising:
receiving print job data including setting information for a calibration; and
switching a setting for the calibration between a first mode of storing a current set calibration data in a memory, performing calibration processing on the received print job data only by using a created calibration data based on the setting information and resetting the current set calibration data read from the memory for subsequent received print job data or a second mode of performing calibration processing on the received print job data and subsequent received print job data by using the created calibration data based on the setting information.

2. The image processing method according to claim 1, wherein the print job data is received from a remote location via a network.

3. The image processing method according to claim 1, wherein processing is performed on intermediate data resulting from conversion of the print job data by using calibration data created based on the setting information.

4. The image processing method according to claim 1, wherein the calibration is a calibration for primary colors and a calibration for multi-order colors.

5. The image processing method according to claim 4, wherein the primary color calibration creates a one-dimensional LUT for correcting data of multiple color components in accordance with the job data for each of the color components.

6. The image processing method according to claim 4, wherein the multi-order calibration corrects a profile for processing data of multiple color components in accordance with the print job data.

7. The image processing method according to claim 1, wherein the setting information is received as a job ticket.

8. The image processing method according to claim 1, wherein the calibration processing includes performing patch output, automatically reading the patch output, and creating the calibration data.

9. An image processor comprising:
receiving means receiving print job data including setting information for a calibration; and
switching means switching a setting for the calibration, using calibration data based on the setting information between a first mode of storing a current set calibration data in a memory, performing calibration processing on the received print job data only by using a created calibration data based on the setting information and resetting the current set calibration data read from the memory for subsequent received print job data or a second mode of performing calibration processing on the received print job data and subsequent received print job data by using the created calibration data based on the setting information.

10. A storage medium storing computer-executable process steps for processing an image, the computer-executable process steps comprising:
receiving print job data including setting information for a calibration; and
switching the setting for the calibration between a first mode of storing a current set calibration data in a memory, performing calibration processing on the received print job data only by using a created calibration data based on the setting information and resetting the current set calibration data read from the memory for subsequent received print job data or a second mode of performing calibration processing on the received print job data and subsequent received print job data by using the created calibration data based on the setting information.

* * * * *